(12) United States Patent
Lee et al.

(10) Patent No.: US 11,363,260 B2
(45) Date of Patent: Jun. 14, 2022

(54) METHOD AND APPARATUS FOR DERIVING INTRA PREDICTION MODE

(71) Applicants: Electronics and Telecommunications Research Institute, Daejeon (KR); Industry-University Cooperation Foundation Korea Aerospace University, Goyang-si (KR); Industry-Academia Cooperation Group of Sejong University, Seoul (KR)

(72) Inventors: Jin-Ho Lee, Daejeon (KR); Jae-Gon Kim, Goyang-si (KR); Jung-Won Kang, Daejeon (KR); Do-Hyeon Park, Goyang-si (KR); Yung-Lyul Lee, Seoul (KR); Ha-Hyun Lee, Seoul (KR); Sung-Chang Lim, Daejeon (KR); Hui-Yong Kim, Daejeon (KR); Ji-Hoon Do, Busan (KR); Yong-Uk Yoon, Jeju-si (KR)

(73) Assignees: Electronics and Telecommunications Research Institute, Daejeon (KR); Industry-University Cooperation Foundation Korea Aerospace University, Goyang-si (KR); Industry-Academia Cooperation Group of Sejong University, Seoul (KR)

(*) Notice: Subject to any disclaimer, the term of this patent is extended or adjusted under 35 U.S.C. 154(b) by 0 days.

(21) Appl. No.: 16/983,218

(22) Filed: Aug. 3, 2020

(65) Prior Publication Data
US 2021/0021816 A1    Jan. 21, 2021

Related U.S. Application Data

(63) Continuation of application No. 16/299,661, filed on Mar. 12, 2019, now Pat. No. 10,771,781.

(30) Foreign Application Priority Data

Mar. 12, 2018  (KR) .................. 10-2018-0028839
Mar. 8, 2019   (KR) .................. 10-2019-0026904

(51) Int. Cl.
*H04N 19/11*       (2014.01)
*H04N 19/159*      (2014.01)
(Continued)

(52) U.S. Cl.
CPC ........... *H04N 19/11* (2014.11); *H04N 19/105* (2014.11); *H04N 19/119* (2014.11); *H04N 19/159* (2014.11); *H04N 19/176* (2014.11)

(58) Field of Classification Search
None
See application file for complete search history.

(56) References Cited

U.S. PATENT DOCUMENTS 9,143,798 B2   9/2015   Jeong et al.
9,202,289 B2   12/2015  Kim et al.
(Continued)

FOREIGN PATENT DOCUMENTS

EP   3 276 958 A1    1/2018
EP   3276958 A1 *    1/2018   ........... H04N 19/593
(Continued)

OTHER PUBLICATIONS

Wiegand, Thomas et al., "WD3: Working Draft 3 of High-Efficiency Video Coding", *Joint Collaborative Team on Video Coding (JCT-VC) of ITU-T SG 16 WP3 and ISO/IEC JTC1/SC29/WG11*, 5th Meeting, Geneva, Switzerland, Mar. 16-23, 2011 (213 pages in English).

*Primary Examiner* — Reza Aghevliz
(74) *Attorney, Agent, or Firm* — NSIP Law

(57) ABSTRACT

Disclosed herein are a decoding method and apparatus and an encoding method and apparatus for deriving an intra-
(Continued)

prediction mode. An intra-prediction mode may be derived using a method for deriving an intra-prediction mode based on a neighbor block of the target block, a method for deriving an intra-prediction mode using signaling of the intra-prediction mode of the target block, or a method for deriving an adaptive intra-prediction mode based on the type of a target slice. An MPM list may be used to derive the intra-prediction mode, and a temporal neighbor block or the like may be used to configure the MPM list.

11 Claims, 30 Drawing Sheets

(51) Int. Cl.
*H04N 19/176* (2014.01)
*H04N 19/119* (2014.01)
*H04N 19/105* (2014.01)

(56) References Cited

U.S. PATENT DOCUMENTS

| | | | | |
|---|---|---|---|---|
| 9,955,169 | B2* | 4/2018 | Lee | H04N 19/70 |
| 10,771,781 | B2* | 9/2020 | Lee | H04N 19/159 |
| 2012/0082223 | A1* | 4/2012 | Karczewicz | H04N 19/91 |
| | | | | 375/240.12 |
| 2012/0170652 | A1* | 7/2012 | Guo | H04N 19/46 |
| | | | | 375/240.12 |
| 2012/0177118 | A1* | 7/2012 | Karczewicz | H04N 19/463 |
| | | | | 375/240.13 |
| 2012/0307894 | A1* | 12/2012 | Chien | H04N 19/176 |
| | | | | 375/240.12 |
| 2013/0022119 | A1* | 1/2013 | Chien | H04N 19/176 |
| | | | | 375/240.16 |
| 2013/0089144 | A1* | 4/2013 | Lee | H04N 19/593 |
| | | | | 375/240.12 |
| 2013/0188695 | A1* | 7/2013 | Maani | H04N 19/593 |
| | | | | 375/240.12 |
| 2014/0064359 | A1* | 3/2014 | Rapaka | H04N 19/187 |
| | | | | 375/240.02 |
| 2014/0064360 | A1* | 3/2014 | Rapaka | H04N 19/30 |
| | | | | 375/240.02 |
| 2014/0334543 | A1* | 11/2014 | Lee | H04N 19/593 |
| | | | | 375/240.12 |
| 2015/0195566 | A1* | 7/2015 | Hinz | H04N 19/59 |
| | | | | 375/240.13 |
| 2015/0264405 | A1* | 9/2015 | Zhang | H04N 19/60 |
| | | | | 375/240.18 |
| 2016/0044310 | A1* | 2/2016 | Park | H04N 19/593 |
| | | | | 375/240.12 |
| 2016/0316200 | A1* | 10/2016 | Zhang | H04N 19/107 |
| 2017/0094274 | A1* | 3/2017 | Chien | H04N 19/91 |
| 2017/0201747 | A1* | 7/2017 | Son | H04N 19/105 |
| 2017/0289566 | A1 | 10/2017 | He et al. | |
| 2017/0332084 | A1* | 11/2017 | Seregin | H04N 5/9262 |
| 2017/0353730 | A1* | 12/2017 | Liu | H04N 19/11 |
| 2017/0374369 | A1* | 12/2017 | Chuang | H04N 19/70 |
| 2018/0048889 | A1* | 2/2018 | Zhang | H04N 19/159 |
| 2018/0048895 | A1* | 2/2018 | Jeon | H04N 19/167 |
| 2018/0063553 | A1* | 3/2018 | Zhang | H04N 19/463 |
| 2018/0070100 | A1* | 3/2018 | Chen | H04N 19/13 |
| 2018/0091810 | A1* | 3/2018 | Son | H04N 19/115 |
| 2018/0098074 | A1 | 4/2018 | Heo et al. | |
| 2018/0124398 | A1* | 5/2018 | Park | H04N 19/107 |
| 2018/0131943 | A1* | 5/2018 | Park | H04N 19/159 |
| 2018/0199040 | A1* | 7/2018 | Lee | H04N 19/70 |
| 2018/0205946 | A1* | 7/2018 | Zhang | H04N 19/186 |
| 2018/0234679 | A1* | 8/2018 | Heo | H04N 19/105 |
| 2018/0249156 | A1* | 8/2018 | Heo | H04N 19/70 |
| 2018/0309984 | A1* | 10/2018 | Son | H04N 19/105 |
| 2018/0324464 | A1* | 11/2018 | Zhang | H04N 19/91 |
| 2019/0037231 | A1* | 1/2019 | Ikai | H04N 19/52 |
| 2019/0052909 | A1* | 2/2019 | Choi | H04N 19/463 |
| 2019/0082194 | A1* | 3/2019 | Chang | H04N 19/182 |
| 2019/0089952 | A1* | 3/2019 | Liu | H04N 19/46 |
| 2019/0104303 | A1* | 4/2019 | Xiu | H04N 19/59 |
| 2019/0166370 | A1* | 5/2019 | Xiu | H04N 19/147 |
| 2019/0182482 | A1* | 6/2019 | Vanam | H04N 19/117 |
| 2019/0208198 | A1* | 7/2019 | Pettersson | H04N 19/105 |
| 2019/0208201 | A1* | 7/2019 | Yasugi | H04N 19/96 |
| 2019/0246108 | A1* | 8/2019 | Aono | H04N 19/157 |
| 2019/0327466 | A1* | 10/2019 | Ikai | H04N 19/186 |
| 2019/0379914 | A1* | 12/2019 | Misra | H04N 19/132 |
| 2020/0053379 | A1* | 2/2020 | Han | H04N 19/61 |
| 2020/0296403 | A1* | 9/2020 | Han | H04N 19/573 |

FOREIGN PATENT DOCUMENTS

| | | |
|---|---|---|
| KR | 10-1433170 B1 | 8/2014 |
| KR | 10-2017-0126918 A | 11/2017 |
| WO | WO 2016/153146 A1 | 9/2016 |
| WO | WO-2016153146 A1 * | 9/2016 ........... H04N 19/159 |

* cited by examiner

DIAGONAL SCANNING

METHOD AND APPARATUS FOR DERIVING INTRA PREDICTION MODE

CROSS REFERENCE TO RELATED APPLICATIONS

This application claims the benefit of Korean Patent Application Nos. 10-2018-0028839, filed Mar. 12, 2018 and 10-2019-0026904, filed Mar. 8, 2019, which are hereby incorporated by reference in their entirety into this application.

BACKGROUND OF THE INVENTION

1. Technical Field

The following embodiments relate generally to a video decoding method and apparatus and a video encoding method and apparatus, and more particularly, to a decoding method and apparatus and an encoding method and apparatus for deriving an intra-prediction mode.

2. Description of the Related Art

With the continuous development of the information and communication industries, broadcasting services supporting High-Definition (HD) resolution have been popularized all over the world. Through this popularization, a large number of users have become accustomed to high-resolution and high-definition images and/or videos.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is continually required.

An image encoding/decoding apparatus and method may use inter-prediction technology, intra-prediction technology, entropy-coding technology, etc. so as to perform encoding/decoding on a high-resolution and high-definition image. Inter-prediction technology may be technology for predicting the value of a pixel included in a target picture using temporally previous pictures and/or temporally subsequent pictures. Intra-prediction technology may be technology for predicting the value of a pixel included in a target picture using information about pixels in the target picture. Entropy-coding technology may be technology for assigning short code words to frequently occurring symbols and assigning long code words to rarely occurring symbols.

Various inter-prediction technologies and intra-prediction technologies have been developed for more accurate prediction.

SUMMARY OF THE INVENTION

An embodiment is intended to provide an encoding apparatus and method and a decoding apparatus and method, which perform intra-prediction for a target block using a Most Probable Mode (MPM) list.

An embodiment is intended to provide an encoding apparatus and method and a decoding apparatus and method, which configure an MPM list using a temporal neighbor block of a target block.

An embodiment is intended to provide an encoding apparatus and method and a decoding apparatus and method, which configure an MPM list using the directionality of a neighbor block of a target block.

In accordance with an aspect, there is provided a decoding method, including deriving an intra-prediction mode of a target block; and performing intra prediction for the target block that uses the derived intra-prediction mode.

The intra-prediction mode of the target block may be derived based on an intra-prediction mode of a temporal neighbor block of the target block.

The temporal neighbor block may be determined based on a spatial neighbor block of the target block.

The temporal neighbor block may be determined based on motion information of a spatial neighbor block of the target block.

The intra-prediction mode of the target block may be derived based on a block spatially adjacent to a temporal neighbor block of the target block.

The intra-prediction mode of the target block may be derived based on a neighbor block of the target block.

The neighbor block may be selected based on a type of a target slice including the target block.

The intra-prediction mode of the target block may be derived based on directionality of a neighbor block of the target block.

The intra-prediction mode of the target block may be derived using a Most Probable Mode (MPM).

A number of candidate modes in an MPM list may be determined based on a coding parameter related to the target block.

The number of candidate modes may be determined based on at least one of a type of a target slice including the target block, a color component of the target block, a block size of the target block, and a shape of the target block.

The candidate modes may be determined based on an intra-prediction mode derived for a neighbor block of the target block.

The neighbor block may be a block reconstructed via inter prediction.

One or more of intra-prediction modes of neighbor blocks of the target block and one or more predefined intra-prediction modes may be set as the candidate modes in the MPM list in a specific order.

Multiple intra-prediction modes of multiple reference blocks may be used as the candidate modes in the MPM list.

The multiple reference blocks may be present in one or more reference pictures that are selected from among multiple reference pictures in ascending order of distance from a target picture including the target block.

The MPM list may be configured using an intra-prediction mode of a reference block and an intra-prediction mode of a spatial neighbor block of the reference block.

The MPM list may be configured based on an intra-prediction mode of a spatial neighbor block of the target block.

When an intra-prediction mode of the spatial neighbor block is not present, an intra-prediction mode of a reference block may replace the intra-prediction mode of the spatial neighbor block.

A location of the reference block in a reference picture may be identical to a location of the spatial neighbor block in a target picture.

The target picture may include the target block.

The MPM list may be configured based on an intra-prediction mode of a spatial neighbor block of the target block.

When an intra-prediction mode of the spatial neighbor block is not present, an intra-prediction mode of a reference block may replace the intra-prediction mode of the spatial neighbor block.

The reference block may be a block corresponding to motion information of the spatial neighbor block.

An intra-prediction mode to be added to the MPM list may be generated based on an intra-prediction mode included in the MPM list.

The MPM list may be configured based on an intra-prediction mode of a neighbor block of the target block.

The intra-prediction mode of the neighbor block may be derived using directionality of the neighbor block.

The MPM list may be configured for the target block.

The MPM list may be used for each of multiple sub-blocks generated by dividing the target block.

In accordance with another aspect, there is provided an encoding method, including deriving an intra-prediction mode of a target block; and performing intra prediction for the target block that uses the derived intra-prediction mode.

In accordance with a further aspect, there is provided an intra prediction method, including deriving an intra-prediction mode of a target block; and performing intra prediction for the target block that uses the derived intra-prediction mode.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
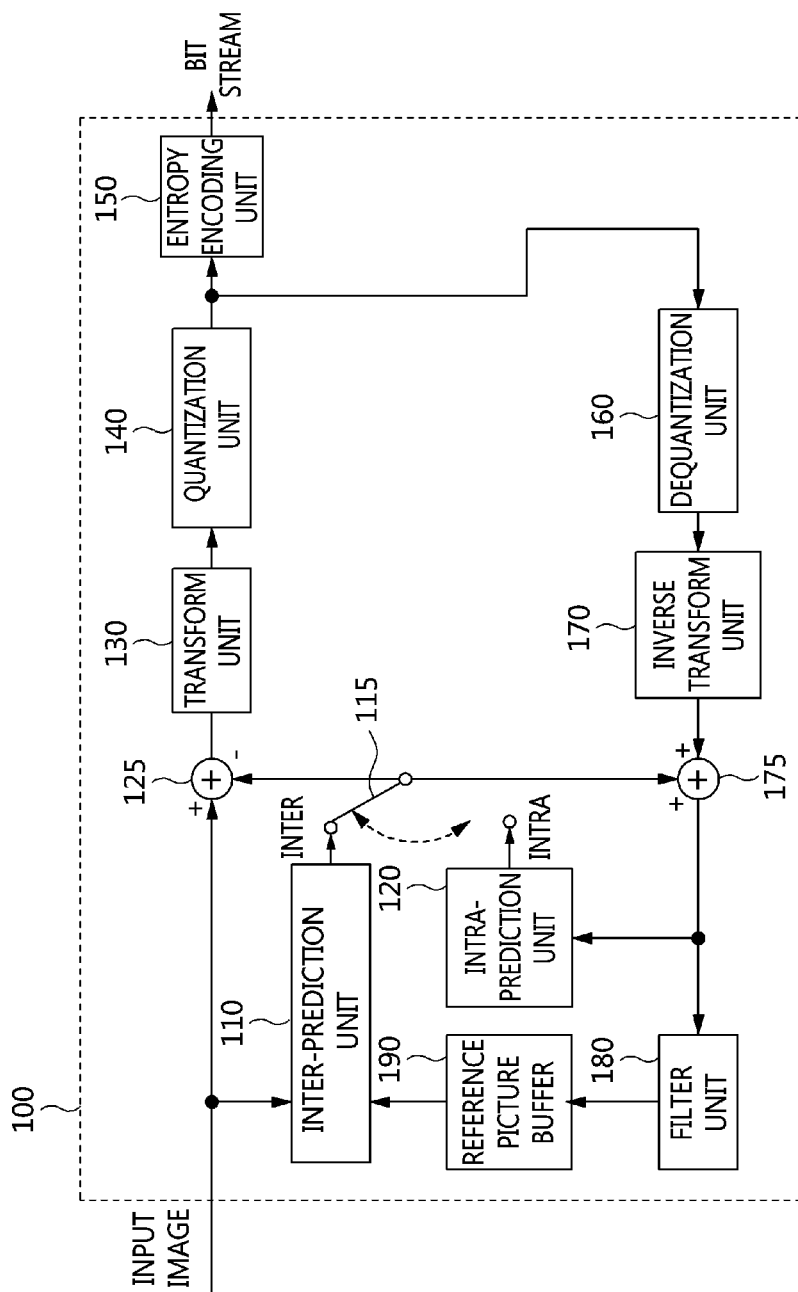
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.

One unit may be partitioned into sub-units, each having a smaller size than that of the relevant unit.

Depth: A depth may denote the degree to which the unit is partitioned. Further, the unit depth may indicate the level at which the corresponding unit is present when units are represented in a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed neighboring a target unit.

A reconstructed neighboring unit may be a unit that is spatially adjacent to the target unit or that is temporally adjacent to the target unit.

A reconstructed spatially neighboring unit may be a unit which is included in a target picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the target picture, or may correspond to the location of the target unit in the target picture.

Parameter set: A parameter set may be header information in the structure of a bitstream. For example, a parameter set may include a video parameter set (VPS), a sequence parameter set (SPS), a picture parameter set (PPS), an adaptation parameter set (APS), etc.

Further, the parameter set may include slice header information and tile header information.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda *R \qquad \text{[Equation 1]}$$

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and/or inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set, a sequence parameter set, a picture parameter set, and an adaptation parameter set. Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Picture Order Count (POC): A POC value for a picture may denote an order in which the corresponding picture is displayed.

Motion vector (MV): A motion vector may be a 2D vector used for inter prediction or motion compensation. A motion vector may mean an offset between a target image and a reference image.

For example, a MV may be represented in a form such as ($mv_x$, $mv_y$). $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as prediction type information, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a difference value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM usage indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium. Information signaled by an encoding apparatus may be used by a decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

An encoding apparatus may generate encoded information by encoding information to be signaled. The encoded information may be transmitted from the encoding apparatus to a decoding apparatus. The decoding apparatus may acquire information by decoding the received encoded information. Here, encoding may be entropy encoding, and decoding may be entropy decoding.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks adjacent to the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighboring block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), information indicating whether a unit/block is partitioned in a ternary tree structure, the partitioning direction of a ternary tree structure (horizontal direction or vertical direction), the partitioning form of a ternary tree structure (symmetrical partitioning or asymmetrical partitioning, etc.), information indicating whether a unit/block is partitioned in a complex tree structure, a combination and a direction (horizontal direction or vertical direction, etc.) of a partitioning of the complex tree structure, a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a POC, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a first transform is used, information indicating whether an additional (secondary) transform is used, first transform selection information (or a first transform index), secondary transform selection information (or a secondary transform index), information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal. The prediction scheme may denote one prediction mode of an intra prediction mode and an inter prediction mode The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate a reconstructed residual block by performing inverse transform for the inversely quantized coefficient. In other words, the reconstructed residual block is a coefficient that has been inversely quantized and inversely transformed. The coefficient that has been inversely quantized and inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, an Adaptive Loop Filter (ALF), and a Non Local Filter (NLF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, a filter corresponding to any one of a strong filter and a weak filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. For a luma signal, information related to whether to apply an adaptive loop filter may be signaled for each CU. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
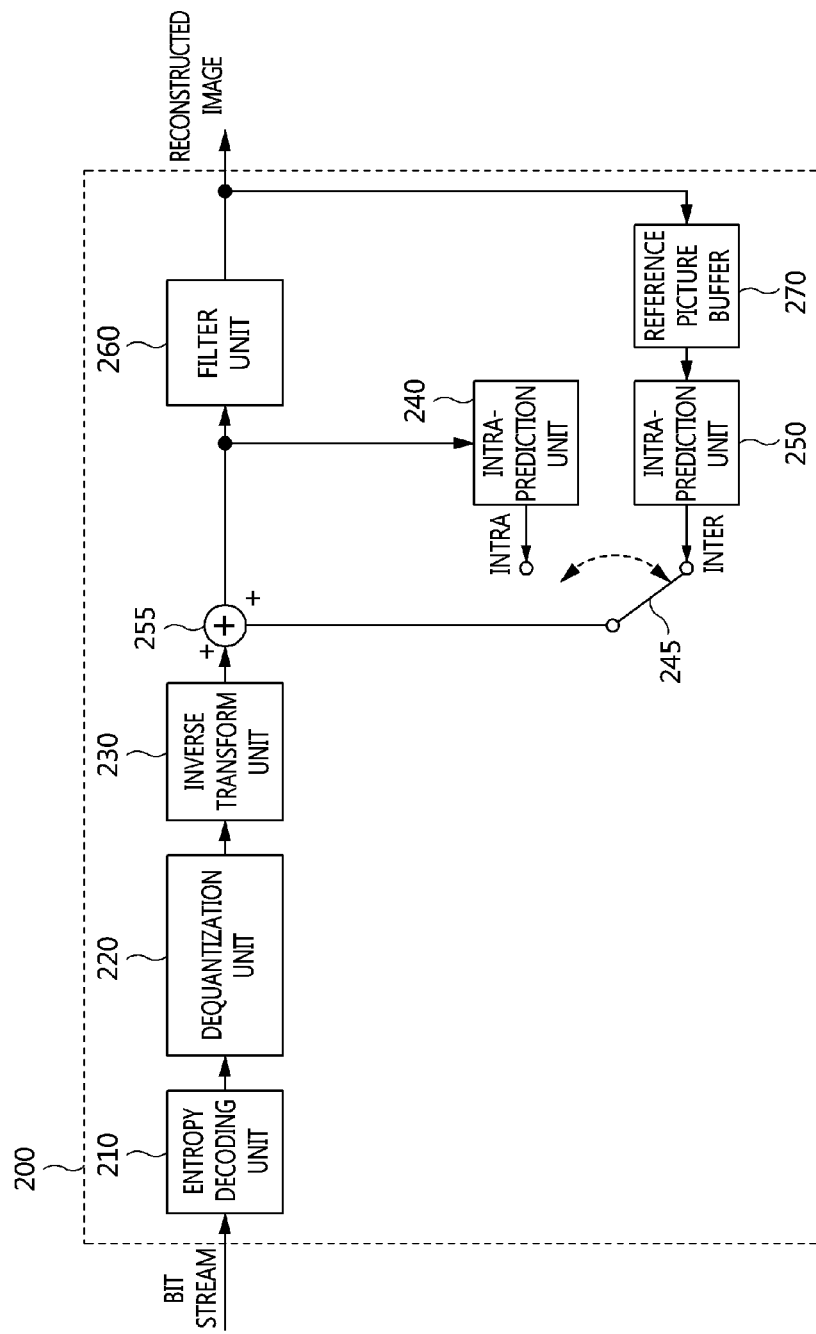
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks adjacent to a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The reconstructed image subjected to filtering may be outputted by the encoding apparatus 100, and may be used by the encoding apparatus.

The reconstructed image subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction.

Figure 3:
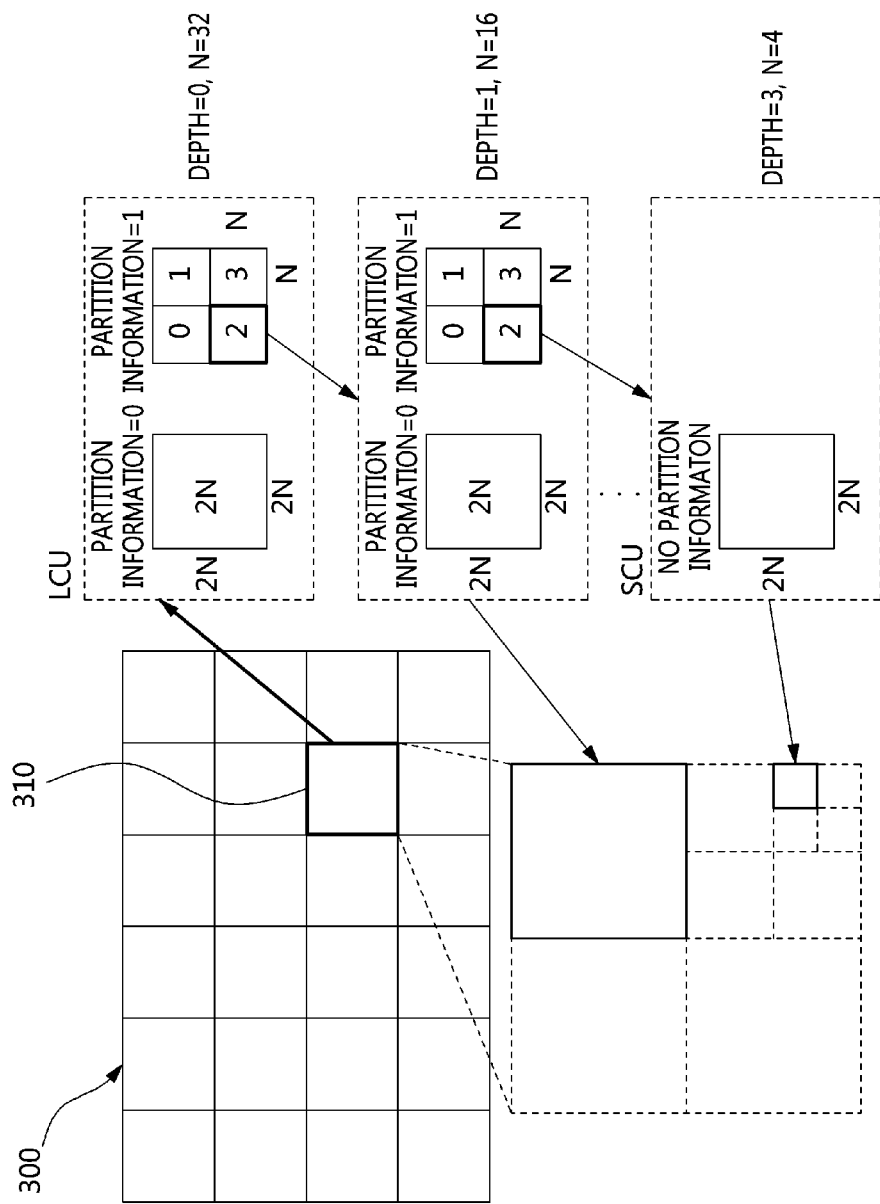
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into sub-units while having depth information based on a tree structure. Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc. The horizontal size and the vertical size of each of CUs generated by the partitioning may be less than the horizontal size and the vertical size of a CU before being partitioned, depending on the number of CUs generated by partitioning.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size. For example, the depth of a CU may have a value ranging from 0 to 3. The size of the CU may range from a size of 64×64 to a size of 8×8 depending on the depth of the CU.

For example, the depth of an LCU may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be 0. The value of the partition information of a CU that is partitioned may be 1.

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

Figure 4:
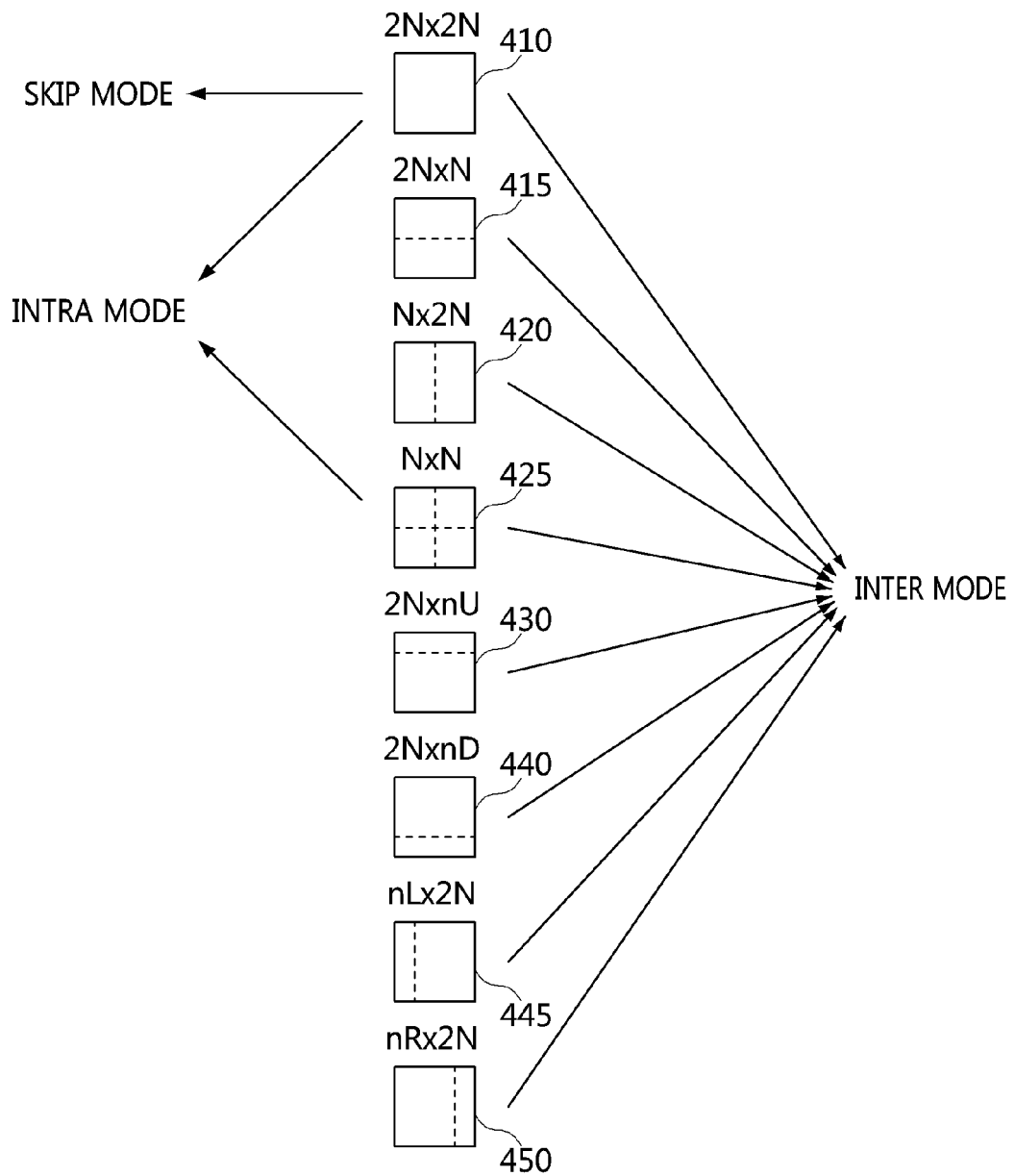
FIG. 4 is a diagram illustrating the form of a Prediction Unit (PU) that a Coding Unit (CU) can include.

FIG. 4 is a diagram illustrating the form of a Prediction Unit (PU) that a Coding Unit (CU) can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
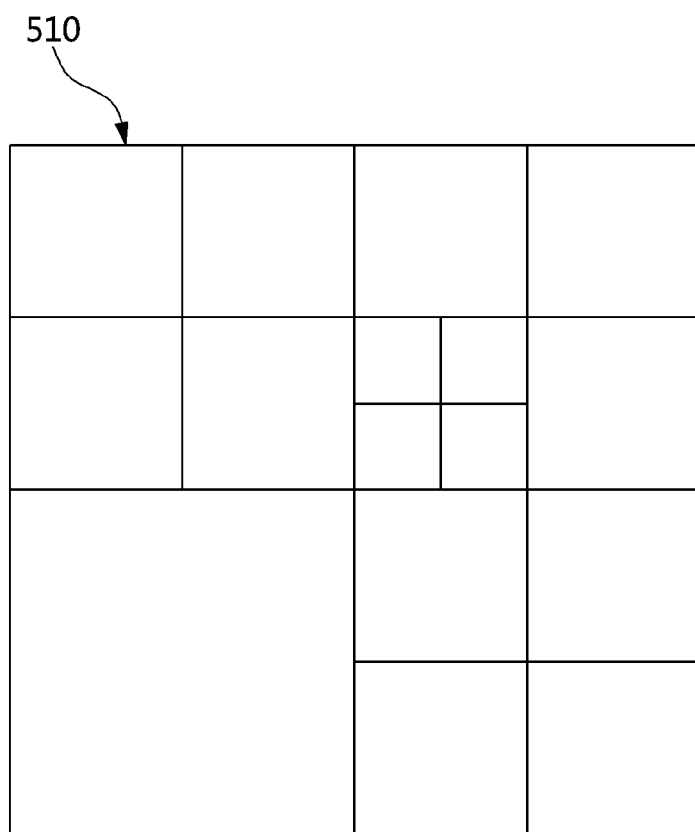
FIG. 5 is a diagram illustrating the form of a Transform Unit (TU) that can be included in a CU.

FIG. 5 is a diagram illustrating the form of a Transform Unit (TU) that can be included in a CU.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be ¼, ½, and ¼, respectively, of the horizontal size or vertical size of the original CU before being split.

For example, when a CU having a 32×32 size is vertically split into three CUs, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
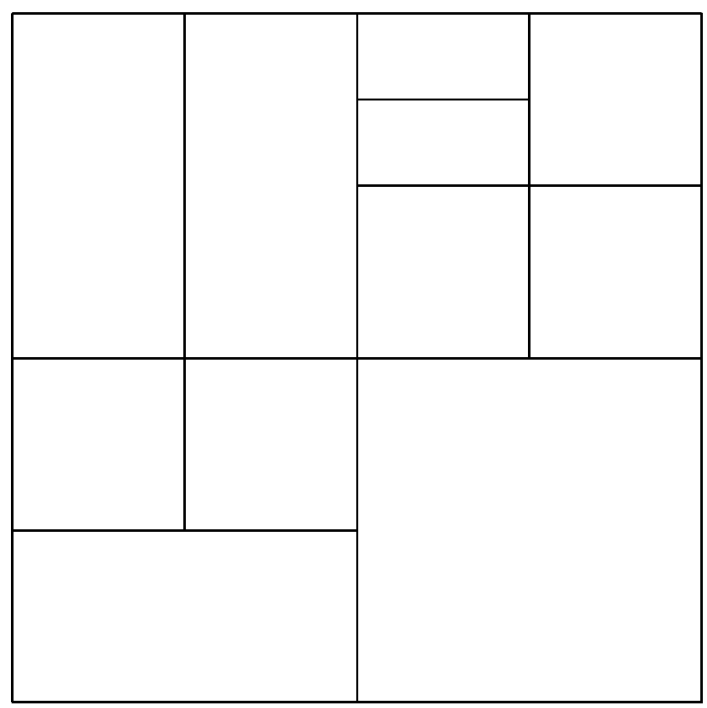
FIG. 6 illustrates splitting of a block according to an example.

FIG. 6 illustrates the splitting of a block according to an example.

In a video encoding and/or decoding process, a target block may be split, as illustrated in FIG. 6.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | 1 |
| | 0 | |
| | 0 | |
| 1 | | |
| 0 | | |
| | 1 | 0 |
| | 0 | |
| | 0 | |
| 0 | | |
| | 0 | |
| | 0 | |
| 0 | | |
| | 1 | 0 |
| | 1 | 1 |
| | 0 | |
| | 0 | |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| 1 | 0 | |
| | 1 | 1 |
| 0 | | |
| 0 | | |
| 1 | | |
| 1 | 0 | |
| | 1 | 0 |
| 0 | | |
| 0 | | |
| 0 | | |
| 0 | | |
| 0 | | |
| 1 | | |
| | 1 | 0 |
| 1 | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block falls within the specific range, only splitting in a binary tree form may be possible. For example, the specific range may be defined by at least one of a maximum block size and a minimum block size at which only splitting in a binary tree form is possible.

Information indicating the maximum block size and/or the minimum block size at which only splitting in a binary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form is performed.

The splitting of a block may be limited by previous splitting. For example, when a block is split in a binary tree form and multiple partition blocks are generated, each partition block may be additionally split only in a binary tree form.

When the horizontal size or vertical size of a partition block is a size that cannot be split further, the above-described indicator may not be signaled.

Figure 7:
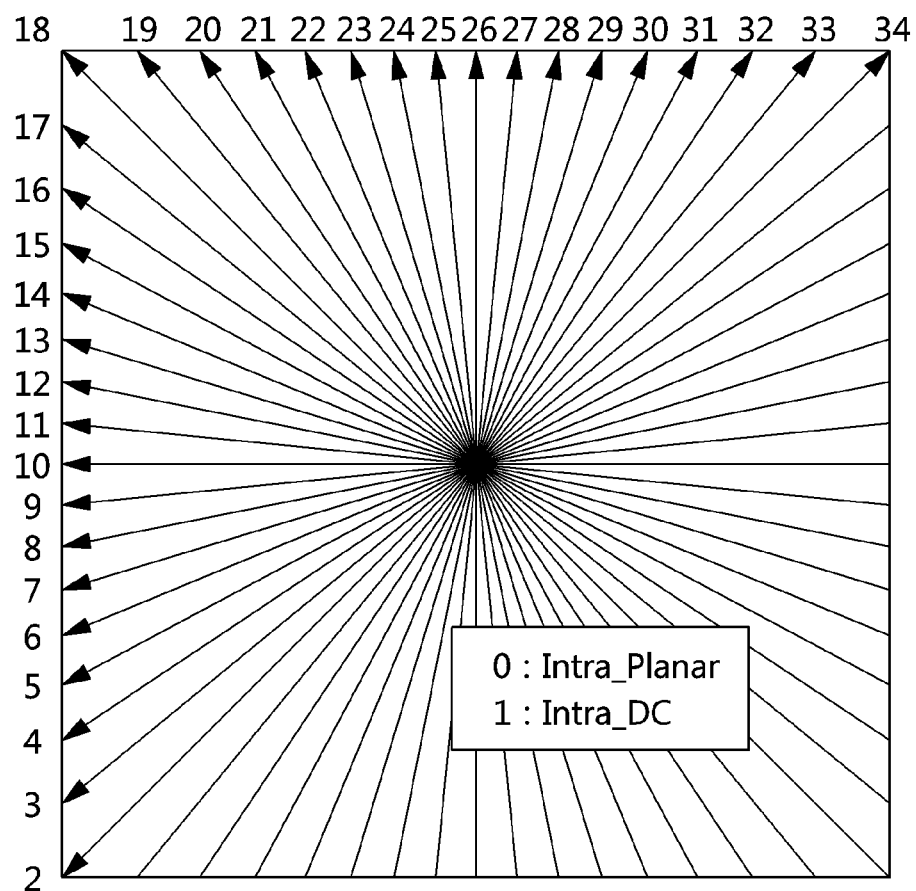
FIG. 7 is a diagram for explaining an embodiment of an intra-prediction procedure.

FIG. 7 is a diagram for explaining an embodiment of an intra-prediction process.

Arrows radially extending from the center of the graph in FIG. 7 indicate the prediction directions of intra-prediction modes. Further, numbers appearing near the arrows indicate examples of mode values assigned to intra-prediction modes or to the prediction directions of the intra-prediction modes.

Intra encoding and/or decoding may be performed using reference samples of blocks neighboring a target block. The neighboring blocks may be neighboring reconstructed blocks. For example, intra encoding and/or decoding may be performed using the values of reference samples which are included in each neighboring reconstructed block or the coding parameters of the neighboring reconstructed block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc.

For example, the number of intra-prediction modes may be fixed at 35 regardless of the size of a prediction block. Alternatively, the number of intra-prediction modes may be, for example, 3, 5, 9, 17, 34, 35, or 36.

The intra-prediction modes may be non-directional modes or directional modes. For example, the intra-prediction modes may include two non-directional modes and 33 directional modes, as shown in FIG. 7.

The two non-directional modes may include a DC mode and a planar mode.

The directional modes may be prediction modes having a specific direction or a specific angle.

The intra-prediction modes may each be represented by at least one of a mode number, a mode value, and a mode angle. The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size and/or the color component of a block. For example, the number of intra-prediction modes may be fixed at any one of 35 and 67 regardless of the size of a block.

Alternatively, the number of intra-prediction modes may differ depending on the size and/or the type of the color component of a block.

For example, the larger the size of the block, the greater the number of intra-prediction modes. Alternatively, the larger the size of the block, the smaller the number of intra-prediction modes. When the size of the block is 4×4 or 8×8, the number of intra-prediction modes may be 67. When the size of the block is 16×16, the number of intra-prediction modes may be 35. When the size of the block is 32×32, the number of intra-prediction modes may be 19. When the size of a block is 64×64, the number of intra-prediction modes may be 7.

For example, the number of intra prediction modes may differ depending on whether a color component is a luma signal or a chroma signal. Alternatively, the number of intra-prediction modes corresponding to a luma component block may be greater than the number of intra-prediction modes corresponding to a chroma component block.

For example, in a vertical mode having a mode value of 26, prediction may be performed in a vertical direction based on the pixel value of a reference sample. For example, in a horizontal mode having a mode value of 10, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 7, the intra-prediction modes in which a mode value is one of 27, 28, 29, 30, 31, 32, 33, and 34 may be vertical-right modes 613. Intra-prediction modes in which a mode value is one of 2, 3, 4, 5, 6, 7, 8, and 9 may be horizontal-below modes 616.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighboring block can be used as reference samples of a target block may be performed. When a sample that cannot be used as a reference sample of the target block is present among samples in the neighboring block, a value generated via copying and/or interpolation that uses at least one sample value, among the samples included in the reconstructed neighboring block, may replace the sample value of the sample that cannot be used as the reference sample. When the value generated via copying and/or interpolation replaces the sample value of the existing sample, the sample may be used as the reference sample of the target block.

In intra prediction, a filter may be applied to at least one of a reference sample and a prediction sample based on at least one of the intra-prediction mode and the size of the target block.

The type of filter to be applied to at least one of a reference sample and a prediction sample may differ depending on at least one of the intra-prediction mode of a target block, the size of the target block, and the shape of the target block. The types of filters may be classified depending on one or more of the number of filter taps, the value of a filter coefficient, and filter strength.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may be predicted from intra prediction mode of a neighboring block adjacent to the target block, and the information used for prediction may be entropy-encoded/decoded.

For example, when the intra-prediction modes of the target block and the neighboring block are identical to each other, it may be signaled, using a predefined flag, that the intra-prediction modes of the target block and the neighboring block are identical.

For example, an indicator for indicating an intra-prediction mode identical to that of the target block, among intra-prediction modes of multiple neighboring blocks, may be signaled.

When the intra-prediction modes of the target block and a neighboring block are different from each other, information about the intra-prediction mode of the target block may be encoded and/or decoded using entropy encoding and/or decoding.

Figure 8:
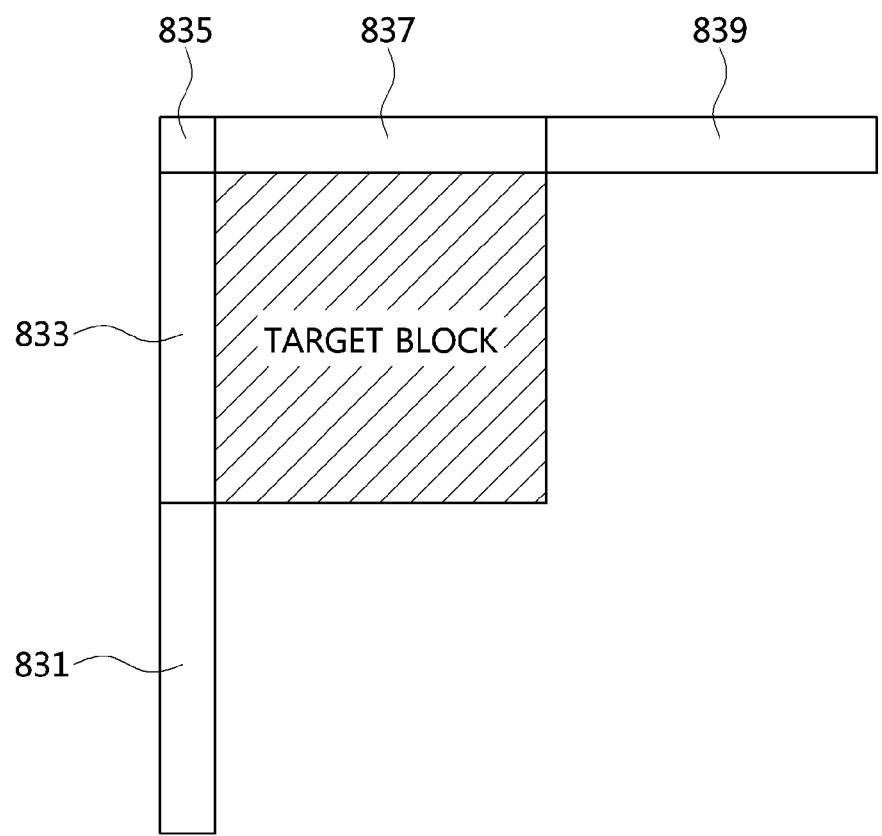
FIG. 8 is a diagram for explaining the locations of reference samples used in an intra-prediction procedure.

FIG. 8 is a diagram for explaining the locations of reference samples used in an intra-prediction procedure.

FIG. 8 illustrates the locations of reference samples used for intra prediction of a target block. Referring to FIG. 8, reconstructed reference samples used for intra prediction of the target block may include below-left reference samples 831, left reference samples 833, an above-left corner reference sample 835, above reference samples 837, and above-right reference samples 839.

For example, the left reference samples 833 may mean reconstructed reference pixels adjacent to the left side of the target block. The above reference samples 837 may mean reconstructed reference pixels adjacent to the top of the target block. The above-left corner reference sample 835 may mean a reconstructed reference pixel located at the above-left corner of the target block. The below-left reference samples 831 may mean reference samples located below a left sample line composed of the left reference samples 833, among samples located on the same line as the left sample line. The above-right reference samples 839 may mean reference samples located to the right of an above sample line composed of the above reference samples 837, among samples located on the same line as the above sample line.

When the size of a target block is N×N, the numbers of the below-left reference samples 831, the left reference samples 833, the above reference samples 837, and the above-right reference samples 839 may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode having a mode value of 26, the above reference samples 837 may be used for intra prediction. When the intra-prediction mode is the vertical mode, the value of a pixel in the prediction block may be the value of a reference sample vertically located above the location of the pixel. Therefore, the above reference samples 837 adjacent to the top of the target block may be used for intra prediction. Furthermore, the values of pixels in one row of the prediction block may be identical to those of the above reference samples 837.

In an example, when the intra-prediction mode of a target block is a horizontal mode having a mode value of 10, the left reference samples 833 may be used for intra prediction. When the intra-prediction mode is the horizontal mode, the value of a pixel in the prediction block may be the value of a reference sample horizontally located left to the location of the pixel. Therefore, the left reference samples 833 adjacent to the left of the target block may be used for intra prediction. Furthermore, the values of pixels in one column of the prediction block may be identical to those of the left reference samples 833.

In an example, when the mode value of the intra-prediction mode of the current block is 18, at least some of the left reference samples 833, the above-left corner reference sample 835, and at least some of the above reference samples 837 may be used for intra prediction. When the mode value of the intra-prediction mode is 18, the value of a pixel in the prediction block may be the value of a reference sample diagonally located at the above-left corner of the pixel.

Further, At least a part of the above-right reference samples 839 may be used for intra prediction in a case that a intra prediction mode having a mode value of 27, 28, 29, 30, 31, 32, 33 or 34 is used.

Further, At least a part of the below-left reference samples 831 may be used for intra prediction in a case that a intra prediction mode having a mode value of 2, 3, 4, 5, 6, 7, 8 or 9 is used.

Further, the above-left corner reference sample 835 may be used for intra prediction in a case that a intra prediction mode of which a mode value is a value ranging from 11 to 25.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighboring blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

Figure 9:
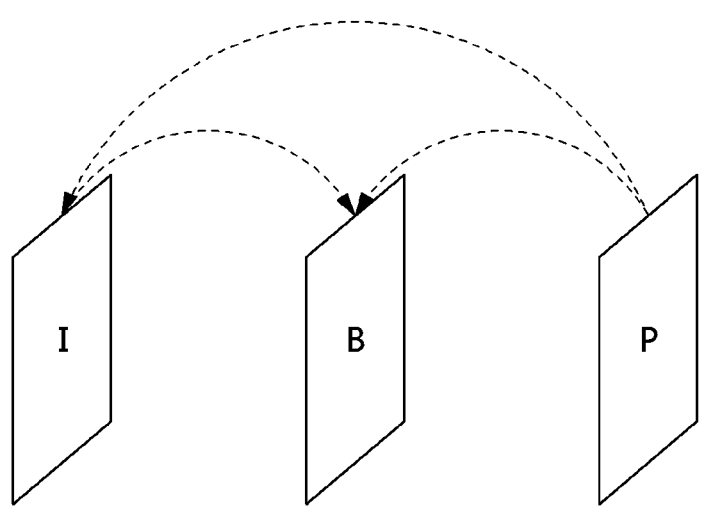
FIG. 9 is a diagram for explaining an embodiment of an inter-prediction procedure.

FIG. 9 is a diagram for explaining an embodiment of an inter prediction procedure.

The rectangles shown in FIG. 9 may represent images (or pictures). Further, in FIG. 9, arrows may represent prediction directions. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction may be performed using motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighboring block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighboring block that is horizontally adjacent to the target block, or a block horizontally adjacent to a neighboring block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first temporal distance to a second temporal distance. The first temporal distance may be the distance between the reference picture and the target picture of the target block. The second temporal distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighboring region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighboring block. In other words, the motion vector of the reconstructed neighboring block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

An MVD may be the difference between the motion vector of the target block and the prediction motion vector. The encoding apparatus 100 may calculate an MVD and may entropy-encode the MVD.

The MVD may be transmitted from the encoding apparatus 100 to the decoding apparatus 200 through a bitstream. The decoding apparatus 200 may decode the received MVD. The decoding apparatus 200 may derive the motion vector of the target block by summing the decoded MVD and the prediction motion vector. In other words, the motion vector of the target block derived by the decoding apparatus 200 may be the sum of the entropy-decoded MVD and the motion vector candidate.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture to be used for prediction of a target block, among reference pictures in the reference picture list. The reference picture index may be entropy-encoded by the encoding apparatus 100. The entropy-encoded reference picture index may be signaled to the decoding apparatus 200 by the encoding apparatus 100 through a bitstream.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighboring blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighboring blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighboring units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighboring block.

When a merge mode is used, the encoding apparatus 100 may predict the motion information of a target block using the motion information of a spatial candidate and/or the motion information of a temporal candidate. The spatial candidate may include a reconstructed spatial neighboring block that is spatially adjacent to the target block. The spatial neighboring block may include a left adjacent block and an above adjacent block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. Further, the merge candidate list may include new merge candidates generated by a combination of merge candidates that are already present in the merge candidate list. In other words, the merge candidate list may include new motion information generated by a combination of pieces of motion information previously present in the merge candidate list.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100.

The decoding apparatus 200 may perform inter prediction on the target block using the inter-prediction information of the bitstream.

The inter-prediction information may contain 1) mode information indicating whether a merge mode is used and 2) a merge index.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighboring blocks spatially or temporally adjacent to the target block.

The encoding apparatus 100 may select a merge candidate having the highest encoding performance among the merge candidates included in the merge candidate list and set a value of the merge index to indicate the selected merge candidate.

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVD, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

In the above-described AMVP mode, merge mode, and skip mode, motion information to be used for the prediction of a target block may be specified, among pieces of motion information in the list, using the index of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
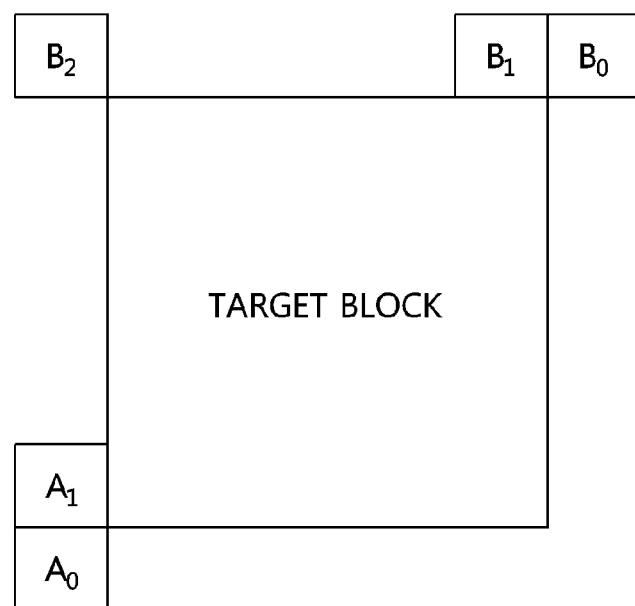
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 11:
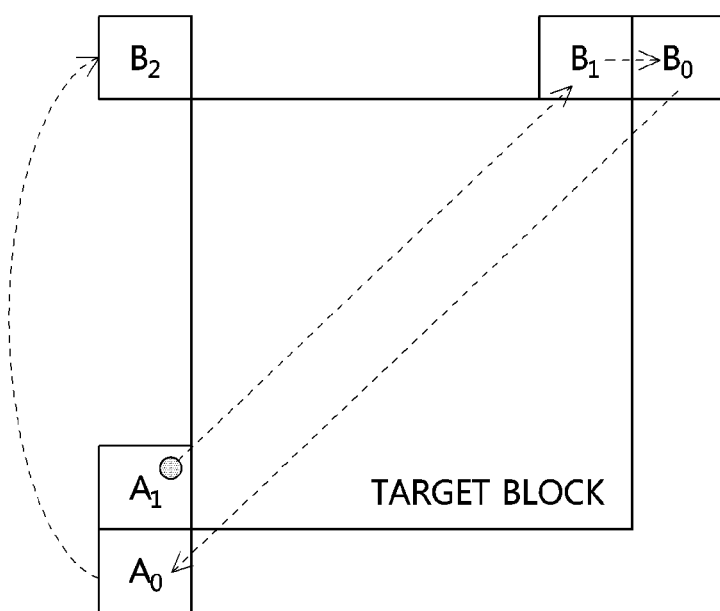
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1, B_1, B_0, A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
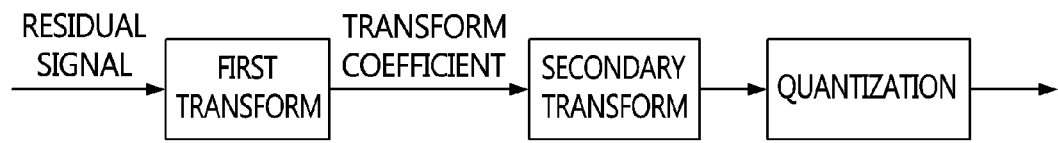
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in each of the following Table 3 and the following table 4.

TABLE 3

| Transform set | Transform candidates |
|---|---|
| 0 | DST-VII, DCT-VIII |
| 1 | DST-VII, DST-I |
| 2 | DST-VII, DCT-V |

TABLE 4

| Transform set | Transform candidates |
|---|---|
| 0 | DST-VII, DCT-VIII, DST-I |
| 1 | DST-VII, DST-I, DCT-VIII |
| 2 | DST-VII, DCT-V, DST-I |

As shown in Table 3 and Table 4, when a DCT type or a DST type to be used for a transform is derived, transform sets may be used. Each transform set may include multiple transform candidates. Each transform candidate may be a DCT type or a DST type.

The following Table 5 shows examples of a transform set to be applied to a horizontal direction and a transform set to be applied to a vertical direction depending on intra-prediction modes.

TABLE 5

| | Intra-prediction mode | | | | | | | | | |
|---|---|---|---|---|---|---|---|---|---|---|
| | 0 | 1 | 2 | 3 | 4 | 5 | 6 | 7 | 8 | 9 |
| Vertical transform set | 2 | 1 | 0 | 1 | 0 | 1 | 0 | 1 | 0 | 1 |
| Horizontal transform set | 2 | 1 | 0 | 1 | 0 | 1 | 0 | 1 | 0 | 1 |

TABLE 5-continued

| | Intra-prediction mode | | | | | | | | | |
|---|---|---|---|---|---|---|---|---|---|---|
| | 10 | 11 | 12 | 13 | 14 | 15 | 16 | 17 | 18 | 19 |
| Vertical transform set | 0 | 1 | 0 | 1 | 0 | 0 | 0 | 0 | 0 | 0 |
| Horizontal transform set | 0 | 1 | 0 | 1 | 2 | 2 | 2 | 2 | 2 | 2 |

| | Intra-prediction mode | | | | | | | | | |
|---|---|---|---|---|---|---|---|---|---|---|
| | 20 | 21 | 22 | 23 | 24 | 25 | 26 | 27 | 28 | 29 |
| Vertical transform set | 0 | 0 | 0 | 1 | 0 | 1 | 0 | 1 | 0 | 1 |
| Horizontal transform set | 2 | 2 | 2 | 1 | 0 | 1 | 0 | 1 | 0 | 1 |

| | Intra-prediction mode | | | | | | | | | |
|---|---|---|---|---|---|---|---|---|---|---|
| | 30 | 31 | 32 | 33 | 34 | 35 | 36 | 37 | 38 | 39 |
| Vertical transform set | 0 | 1 | 0 | 1 | 0 | 1 | 0 | 1 | 0 | 1 |
| Horizontal transform set | 0 | 1 | 0 | 1 | 0 | 1 | 0 | 1 | 0 | 1 |

| | Intra-prediction mode | | | | | | | | | |
|---|---|---|---|---|---|---|---|---|---|---|
| | 40 | 41 | 42 | 43 | 44 | 45 | 46 | 47 | 48 | 49 |
| Vertical transform set | 0 | 1 | 0 | 1 | 0 | 1 | 2 | 2 | 2 | 2 |
| Horizontal transform set | 0 | 1 | 0 | 1 | 0 | 1 | 0 | 0 | 0 | 0 |

| | Intra-prediction mode | | | | | | | | | |
|---|---|---|---|---|---|---|---|---|---|---|
| | 50 | 51 | 52 | 53 | 54 | 55 | 56 | 57 | 58 | 59 |
| Vertical transform set | 2 | 2 | 2 | 2 | 2 | 1 | 0 | 1 | 0 | 1 |
| Horizontal transform set | 0 | 0 | 0 | 0 | 0 | 1 | 0 | 1 | 0 | 1 |

| | Intra-prediction mode | | | | | | |
|---|---|---|---|---|---|---|---|
| | 60 | 61 | 62 | 63 | 64 | 65 | 66 |
| Vertical transform set | 0 | 1 | 0 | 1 | 0 | 1 | 0 |
| Horizontal transform set | 0 | 1 | 0 | 1 | 0 | 1 | 0 |

In Table 5, numbers of vertical transform sets and horizontal transform sets that are to be applied to the horizontal direction of a residual signal depending on the intra-prediction modes of the target block are indicated.

As exemplified in FIGS. 4 and 5, transform sets to be applied to the horizontal direction and the vertical direction may be predefined depending on the intra-prediction mode of the target block. The encoding apparatus 100 may perform a transform and an inverse transform on the residual signal using a transform included in the transform set corresponding to the intra-prediction mode of the target block. Further, the decoding apparatus 200 may perform an inverse transform on the residual signal using a transform included in the transform set corresponding to the intra-prediction mode of the target block.

In the transform and inverse transform, transform sets to be applied to the residual signal may be determined, as exemplified in Tables 3, and 4, and may not be signaled. Transform indication information may be signaled from the encoding apparatus 100 to the decoding apparatus 200. The transform indication information may be information indicating which one of multiple transform candidates included in the transform set to be applied to the residual signal is used.

For example, when the size of the target block is 64×64 or less, transform sets, each having three transforms, may be configured depending on the intra-prediction modes, as shown in the examples of Table 4. An optimal transform method may be selected from among a total of nine multiple transform methods resulting from combinations of three transforms in a horizontal direction and three transforms in a vertical direction. Through such an optimal transform method, the residual signal may be encoded and/or decoded, and thus coding efficiency may be improved.

Here, information indicating which one of transforms belonging to each transform set has been used for at least one of a vertical transform and a horizontal transform may be entropy-encoded and/or -decoded. Here, truncated unary binarization may be used to encode and/or decode such information.

As described above, methods using various transforms may be applied to a residual signal generated via intra prediction or inter prediction.

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different transforms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various types depending on a kernel function that defines a Discrete Cosine Transform (DCT) or a Discrete Sine Transform (DST).

For example, the first transform may include transforms, such as DCT-2, DCT-5, DCT-7, DST-1, and DST-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transform type | Transform kernel function $T_i(j)$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \sqrt{\dfrac{2}{N}}$ ($i = 0$) or 1 (otherwise) |
| DST-7 | $T_i(j) = \sqrt{\dfrac{4}{2N+1}} \cdot \sin\left(\dfrac{\pi \cdot (2j+1) \cdot (j+1)}{2N+1}\right)$ |
| DCT-5 | $T_i(j) = \omega_0 \cdot \omega_1 \cdot \sqrt{\dfrac{2}{2N-1}} \cdot \cos\left(\dfrac{2\pi \cdot i \cdot j}{2N+1}\right)$ where $\omega_{0/1} = \sqrt{\dfrac{2}{N}}$ ($i$ or $j = 0$) of 1 (otherwise) |
| DCT-8 | $T_i(j) = \sqrt{\dfrac{4}{2N+1}} \cdot \cos\left(\dfrac{\pi \cdot (2j+1) \cdot (2j+1)}{4N+2}\right)$ |
| DST-1 | $T_i(j) = \sqrt{\dfrac{2}{N+1}} \cdot \sin\left(\dfrac{\pi \cdot (i+1) \cdot (j+1)}{N+1}\right)$ |

In Table 6, i and j may be integer values that are equal to or greater than 0 and are less than or equal to N−1.

The secondary transform may be performed on the transform coefficient generated by performing the first transform.

As in the first transform, transform sets may also be defined in a secondary transform. The methods for deriving and/or determining the above-described transform sets may be applied not only to the first transform but also to the secondary transform.

The first transform and the secondary transform may be determined for a specific target.

For example, a first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighboring block. For example, whether to apply the first transform and/or the secondary transform may be determined depending on the size and/or shape of the target block.

In the encoding apparatus 100 and the decoding apparatus 200, transform information indicating the transform method to be used for the target may be derived by utilizing specified information.

For example, the transform information may include a transform index to be used for a primary transform and/or a secondary transform. Alternatively, the transform information may indicate that a primary transform and/or a secondary transform are not used.

For example, when the target of a primary transform and a secondary transform is a target block, the transform method(s) to be applied to the primary transform and/or the secondary transform indicated by the transform information may be determined depending on at least one of coding parameters for the target block and/or blocks neighboring the target block.

Alternatively, transform information for a specific target may be signaled from the encoding apparatus 100 to the decoding apparatus 200.

For example, for a single CU, whether to use a primary transform, an index indicating the primary transform, whether to use a secondary transform, and an index indicating the secondary transform may be derived as the transform information by the decoding apparatus 200. Alternatively, for a single CU, the transform information, which indicates whether to use a primary transform, an index indicating the primary transform, whether to use a secondary transform, and an index indicating the secondary transform, may be signaled.

The quantized transform coefficient (i.e. the quantized levels) may be generated by performing quantization on the result, generated by performing the first transform and/or the secondary transform, or on the residual signal.

Figure 13:
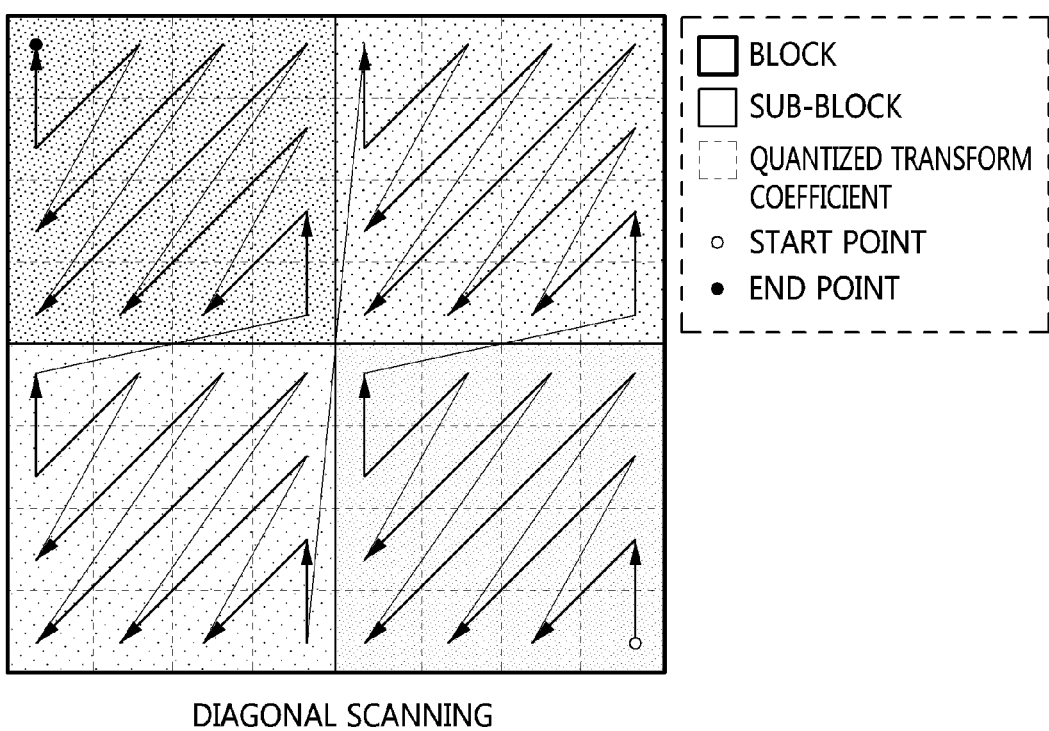
FIG. 13 illustrates diagonal scanning according to an example.

FIG. 13 illustrates diagonal scanning according to an example.

Figure 14:
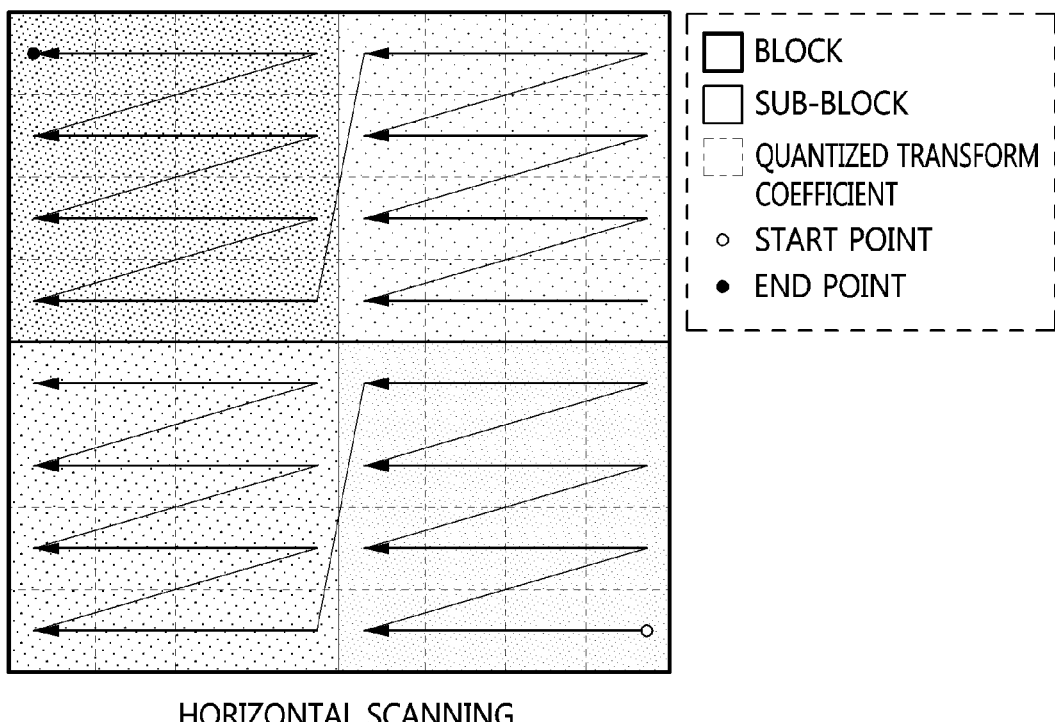
FIG. 14 illustrates horizontal scanning according to an example.

FIG. 14 illustrates horizontal scanning according to an example.

Figure 15:
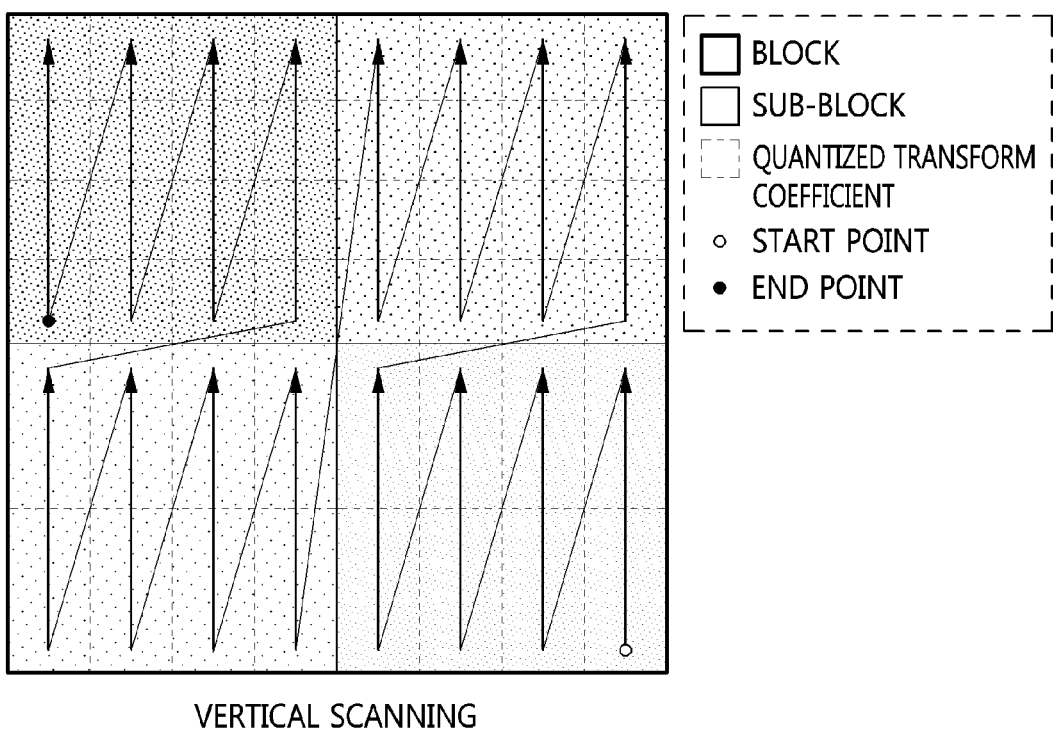
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra-prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra-prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter-prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a first transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The scanned quantized transform coefficients may be entropy-encoded, and a bitstream may include the entropy-encoded quantized transform coefficients.

The decoding apparatus 200 may generate quantized transform coefficients via entropy decoding on the bitstream. The quantized transform coefficients may be aligned in the form of a 2D block via inverse scanning Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

Figure 16:
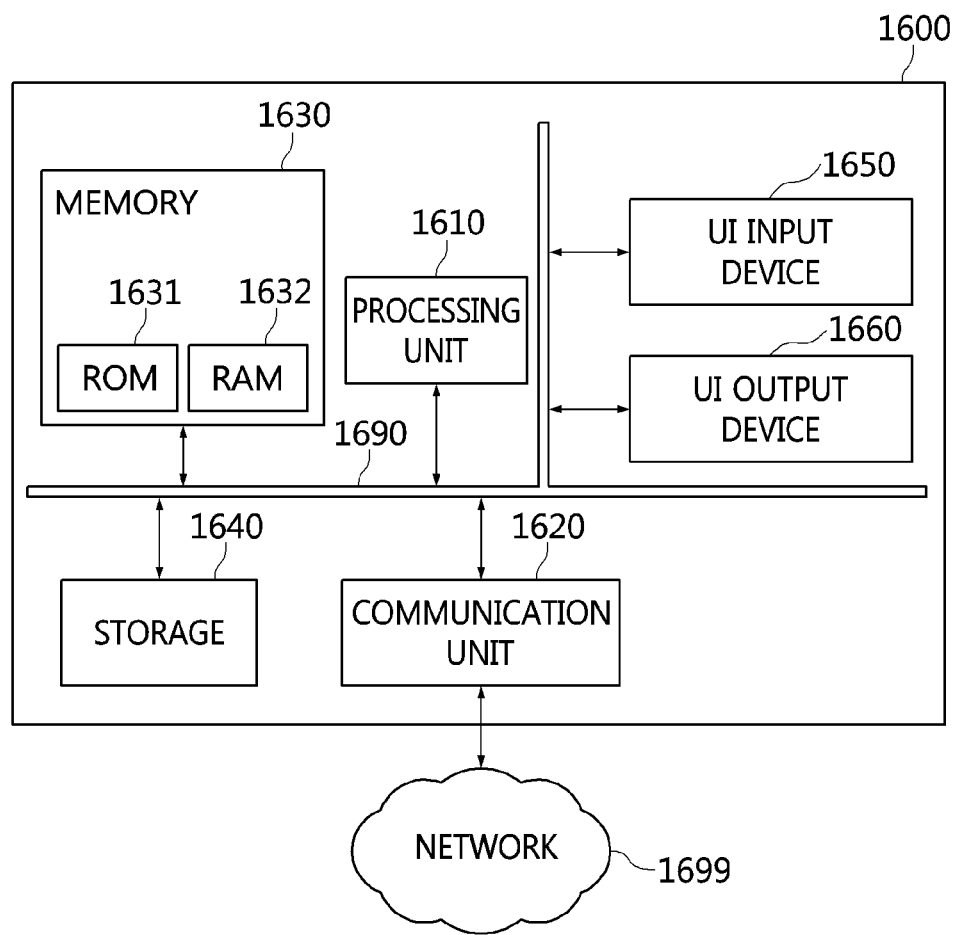
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter-prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1220.

For example, the communication unit 1620 may transmit a bitstream to a decoding apparatus 1600, which will be described later.

Figure 17:
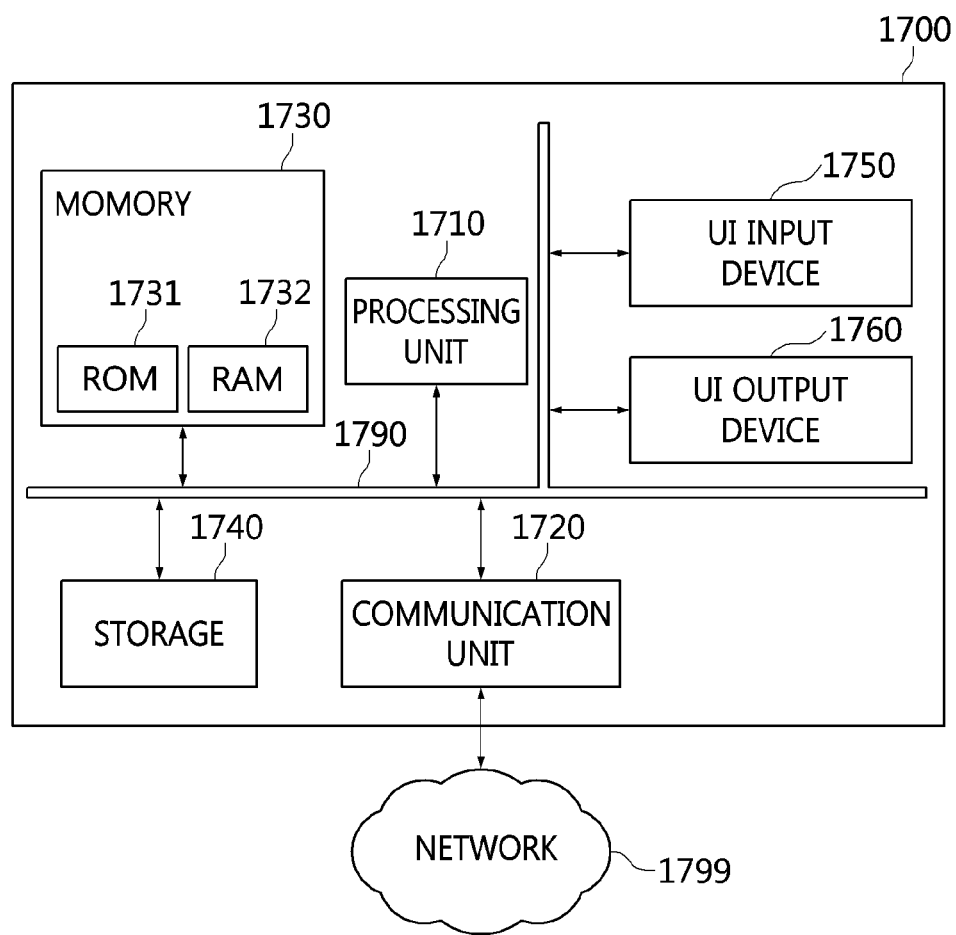
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1399.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra-prediction unit 240, an inter-prediction unit 250, a switch 245, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra-prediction unit 240, the inter-prediction unit 250, the switch 245, the adder 255, the filter unit 260, and the reference picture buffer 270.

A storage unit may denote the memory 1730 and/or the storage 1740. Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter-prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1700.

Derivation of Intra-Prediction Mode

With the development of video compression technology, the number of intra-prediction modes to be used for intra prediction may be further increased compared to existing technology. As the number of intra-prediction modes is increased, the number of bits required in order to represent signal intra-prediction modes may be increased, and the overhead caused by the increase in the number of bits may also be increased.

For efficient signaling of an increased number of intra-prediction modes, various methods for specifying intra-prediction modes may be used. For example, intra-prediction modes of a target block may be represented by a Most Probable Mode (MPM) list and an MPM indicator for the MPM list.

The MPM list for the target block may be composed of intra-prediction modes that can probabilistically, desirably represent the intra-prediction modes of the target block. Here, the fact that the intra-prediction modes of the MPM list can probabilistically, desirably represent the intra-prediction modes of the target block may mean that the probability that an intra-prediction mode actually used for encoding and decoding of the target block will be one of intra-prediction modes included in the MPM list is high. Alternatively, the fact that the intra-prediction modes of the MPM list can probabilistically, desirably represent the intra-prediction modes of the target block may mean that an intra-prediction mode considered to have a high probability of being actually used for encoding and decoding of the target block, among available intra-prediction modes, is included in the MPM list. Here, the above-described probability or the like may be derived through various experiments.

A small number of bits may be allocated to the intra-prediction mode belonging to the MPM list. Signaling that uses a small number of bits may be performed for the intra-prediction mode belonging to the MPM list, and encoding and/or decoding for intra prediction for the target block may be more effectively performed through such assignment and signaling.

The MPM list may be configured using the intra-prediction mode of a spatial neighbor block of the target block. Here, the intra-prediction mode of the spatial neighbor block may mean an intra-prediction mode that has been previously derived and used for encoding and/or decoding of the spatial neighbor block.

Further, 1) an intra-prediction mode to which an offset is applied and/or 2) a default intra-prediction mode may be added to the MPM list. The intra-prediction mode to which the offset is applied may be an intra-prediction mode to which a positive (+) or negative (−) offset is applied to a directional mode, among intra-prediction modes configured in the MPM list. The default intra-prediction mode may be at least some of N default intra-prediction modes, designated as a default for the MPM list.

In order to efficiently perform intra prediction using the MPM list, the intra-prediction mode included in the MPM list must be able to probabilistically, desirably represent the intra-prediction mode of the target block. The above-described default intra-prediction mode may not probabilistically, desirably represent the intra-prediction mode of the target block.

A target slice, which is the target of encoding and/or decoding, may be classified as any one of an I slice, a P slice, and a B slice. For the P slice and the B slice for which inter prediction and intra prediction are used together, there may frequently occur the case where the intra-prediction mode of a neighbor block is unavailable when an MPM list for signaling the intra-prediction mode is configured. In other words, blocks in which intra prediction is used may occupy a relatively low proportion in the P slice and the B slice. When such a block is used as the neighbor block of the target block, the intra-prediction mode of the neighbor block may be unavailable, and may not be used to configure the MPM list.

When the intra-prediction mode of the neighbor block is unavailable, the MPM list may be populated with default mode(s) in order to completely populate the MPM list with a predefined number of intra-prediction modes. Since the default modes do not probabilistically, desirably represent the intra-prediction mode of the target block, the encoding and/or decoding efficiency of the intra-prediction mode may be deteriorated when the MPM list is merely populated with default mode(s).

Due to this, a method for more effectively configuring an MPM list for the purpose of signaling an intra-prediction mode may be required.

Figure 18:
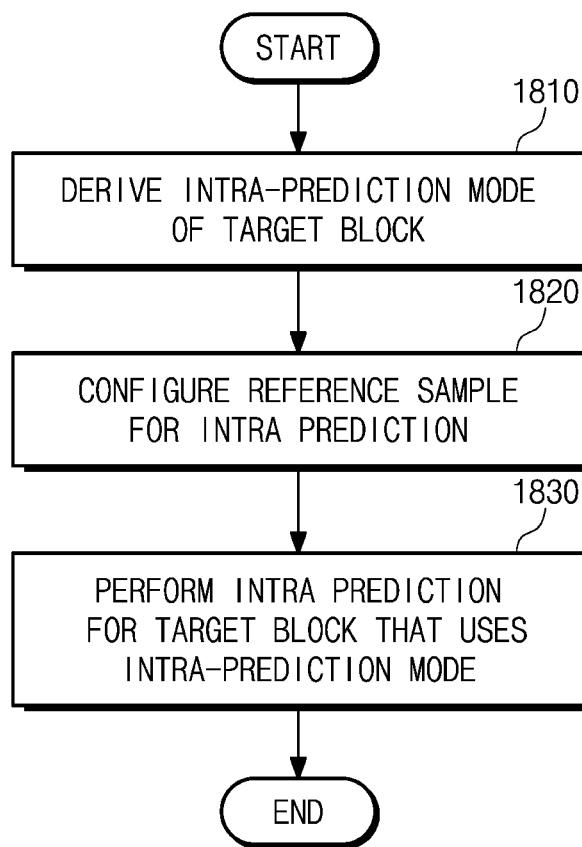
FIG. 18 is a flowchart illustrating an intra-prediction method according to an embodiment.

FIG. 18 is a flowchart illustrating an intra-prediction method according to an embodiment.

The intra-prediction method may be performed by an encoding apparatus 1600 and/or a decoding apparatus 1700.

For example, the encoding apparatus 1600 may perform the intra-prediction method according to the present embodiment so as to compare the efficiencies of multiple prediction schemes for a target block with each other, and may also perform the intra-prediction method according to the present embodiment so as to generate a reconstructed block for the target block.

In an embodiment, the target block may be a Coding Unit (CU). Alternatively, the target block may be at least one of a block having a Coding Tree Block (CTB), a CU, a Prediction Unit (PU), a Transform Unit (TU), a sub-block, a block having a specific block size, and a block having a block size within a predefined range. Alternatively, the target block may be a unit of coding. Alternatively, the target block may indicate a specific region in a target picture.

Hereinafter, the size of the target block may be W×H. W may be the width of the target block. H may indicate the height of the target block. W and H may be positive integers, for example, $2^n$, where n may be a positive integer.

For example, the decoding apparatus 1700 may perform the intra-prediction method according to the present embodiment so as to generate a reconstructed block for the target block.

Below, a processing unit may be the processing unit 1610 of the encoding apparatus 1600 and/or the processing unit 1710 of the decoding apparatus 1700.

At step 1810, the processing unit may derive an intra-prediction mode of the target block.

The processing unit may derive the intra-prediction mode of the target block using one or more of 1) a method for deriving an intra-prediction mode based on a neighbor block of the target block, 2) a method for deriving an intra-prediction mode using signaling of the intra-prediction mode of the target block, and 3) a method for deriving an adaptive intra-prediction mode based on the type of a target slice.

For example, the intra-prediction mode may include a DC mode, a planar mode, an angular prediction mode, a Position-Dependent (intra) Prediction Combination (PDPC) mode, and an intra_fromLuma (LM) mode.

In an embodiment, the intra-prediction mode of the target block may be derived based on one or more of 1) the intra-prediction mode of a spatial neighbor block of the target block, 2) the intra-prediction mode of a temporal neighbor block of the target block, 3) an intra-prediction mode derived based on the picture directionality of a neighbor block of the target block, 4) an intra-prediction mode derived based on MPM, and 5) an intra-prediction mode derived for a sub-block.

For example, the processing unit may derive an intra-prediction mode of the target block using one or more of 1) an intra-prediction mode of a spatial neighbor block of the target block, 2) an intra-prediction mode of a temporal neighbor block of the target block, 3) an intra-prediction mode derived based on the picture directionality of a neighbor block of the target block, 4) an intra-prediction mode derived based on MPM, and 5) an intra-prediction mode derived for a sub-block.

At step 1820, the processing unit may configure a reference sample for intra prediction for the target block.

The processing unit may configure the reference sample using methods corresponding to one or more of 1) selection of a reference sample and 2) filtering of a reference sample.

At step 1830, the processing unit may perform intra prediction for the target block that uses the derived intra-prediction mode.

The processing unit may generate a prediction block for the target block via intra prediction for the target block.

The processing unit may perform intra prediction for the target block using methods corresponding to one or more of 1) non-directional intra prediction, 2) directional intra prediction, 3) location information-based prediction, and 4) inter-color prediction.

Further, the processing unit may perform filtering on prediction samples in the prediction block during a procedure for performing intra prediction.

Derivation of Prediction Mode Using Neighbor Blocks

Figure 19:
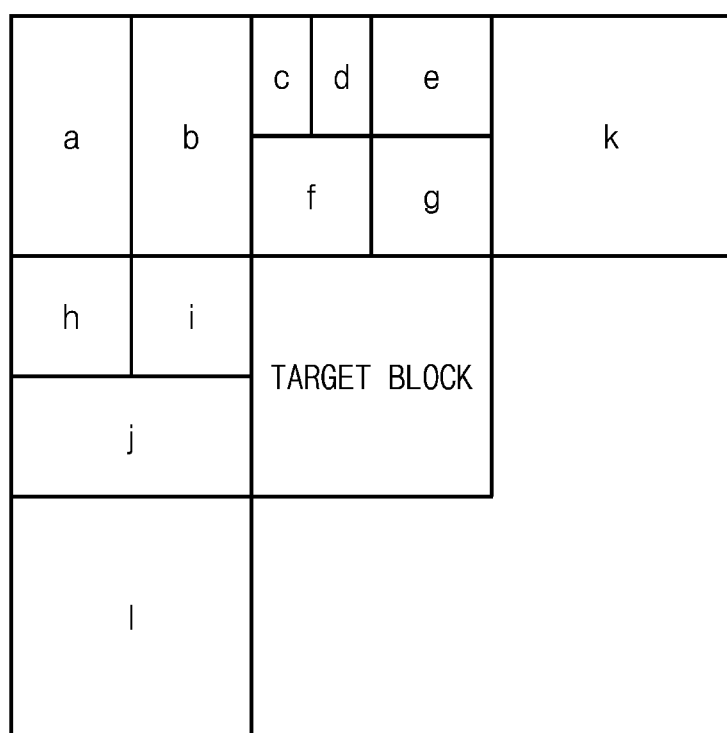
FIG. 19 illustrates neighbor blocks of a target block according to an example.

FIG. 19 illustrates neighbor blocks of a target block according to an example.

In FIG. 19, 'a' to 'l' may denote intra-prediction modes of neighbor blocks of the target block and/or intra-prediction modes of sub-blocks of the neighbor blocks.

At step 1810 of FIG. 18, the processing unit may use the specific mode of a spatial neighbor block of the target block as the intra-prediction mode of the target block. The specific mode may be an intra-prediction mode.

Here, the spatial neighbor block may be a block adjacent to the target block or a reconstructed block which has been previously encoded or decoded.

For example, as illustrated in FIG. 19, a previously encoded or decoded block may be configured at a location adjacent to the target block.

The processing unit may use the specific mode of a block present at a location relative to that of the target block as the intra-prediction mode of the target block.

For example, the intra-prediction mode "i" of a block to which a [−1, 0] sample belongs may be used as the intra-prediction mode of the target block. In other words, the intra-prediction mode of a block adjacent to the left of the target block or the intra-prediction mode of an uppermost block, among blocks adjacent to the left of the target block, may be used as the intra-prediction mode of the target block.

Here, "[x, y]" may indicate relative coordinates of the target block. The "[x, y] sample" may indicate a sample disposed at the location "[x, y]". The coordinates of an upper-left portion of the target block may be "[0, 0]". The width and height of the target block may be W and H, respectively.

For example, the intra-prediction mode "b" of a block to which a [−1, −1] sample belongs may be used as the intra-prediction mode of the current block (target block). In other words, the intra-prediction mode of a block adjacent to the upper-left portion of the target block may be used as the intra-prediction mode of the target block.

For example, the intra-prediction mode "g" of a block to which a [W−1, −1] sample belongs may be used as the intra-prediction mode of the current block. In other words, the intra-prediction mode of a block adjacent to the top of the target block or the intra-prediction mode of the rightmost block, among blocks adjacent to the top of the target block, may be used as the intra-prediction mode of the target block.

For example, the intra-prediction mode "I" of a block to which a [−1, H] sample belongs may be used as the intra-prediction mode of the current block. In other words, the intra-prediction mode of a block adjacent to a lower-left portion of the target block may be used as the intra-prediction mode of the target block.

The processing unit may use a specific mode of the found spatial neighbor block as the intra-prediction mode of the target block. When searching for a spatial neighbor block, the found spatial neighbor block may be a block including a neighbor sample. For example, the location of the neighbor sample may be [−1, −1], [−1, 0], [0, −1], [−1, 2n] or [2n, −1]. Here, n may be a positive integer, such as 1, 2, or 3.

Figure 20:
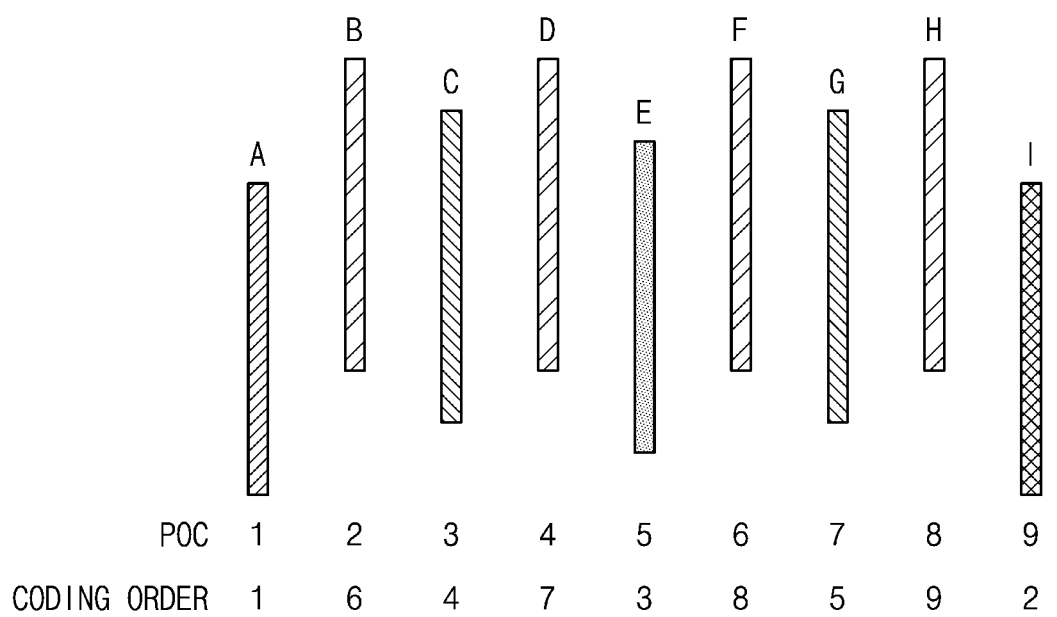
FIG. 20 illustrates reference pictures for a target block, POC of the reference pictures, and the coding order of the reference pictures according to an example.

FIG. 20 illustrates reference pictures for a target block, POC of the reference pictures, and the coding order of the reference pictures according to an example.

In FIG. 20, "A" to "I" may denote respective pictures. Each picture may have a POC and a coding order.

"A" may be an I slice. Each of "B" to "I" may be a P slice or a B slice.

The processing unit may use the specific mode of a temporal neighbor block of the target block as the intra-prediction mode of the target block.

The temporal neighbor block of the target block may be present in a reference picture for which encoding or decoding has been previously completed.

The reference picture may be any of one or more pictures stored in a Decoded Picture Buffer (DPB). The DPB may be the above-described reference picture buffer 190 or the reference picture buffer 270.

Alternatively, the reference picture may be any of N pictures stored in a separate buffer. Here, N may be an integer of 1 or more. For example, when at least one picture of B, C, D, E, F, G, H, and I, corresponding to a P slice or a B slice, is encoded and/or decoded, the processing unit may store A, which is an I slice, in the separate buffer, and may use A, stored in the separate buffer, as the reference picture.

In an embodiment, the reference picture may be fixed as an I slice. In other words, a picture corresponding to the I slice may be used as the reference picture.

Figure 21:
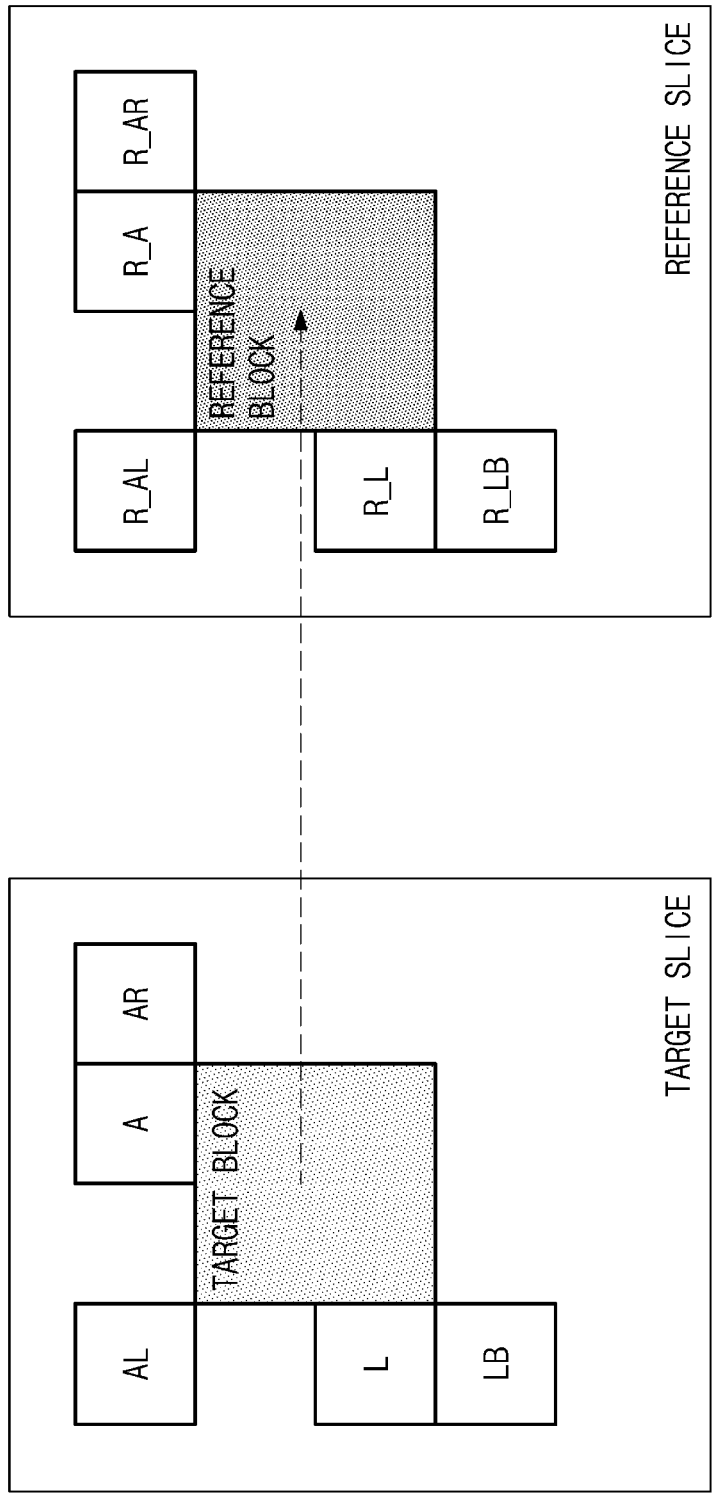
FIG. 21 illustrates a target slice and a reference slice according to an example.

FIG. 21 illustrates a target slice and a reference slice according to an example.

In FIG. 21, AL, A, AR, L, and LB are depicted as spatial neighbor blocks of a target block. Further, in FIG. 21, R_AL, R_A, R_AR, R_L and R_LB are illustrated as spatial neighbor blocks of a reference block for the target block. The locations of the R_AL, R_A, R_AR, R_L, and R_LB relative to the location of the reference block may respectively correspond to the locations of the AL, A, AR, L, and LB relative to the location of the target block.

The temporal neighbor blocks of the target block may be reference blocks present in the reference picture. For example, each temporal neighbor block may be a co-located (col) block.

In an embodiment, a temporal neighbor block may be a block present at a location corresponding to a specific location in the target block. For example, the specific location of the target block in the target picture and the corresponding location in the reference picture may be identical to each other.

For example, the temporal neighbor block may be a reference block present at a location corresponding to the location [0, 0] of the target block.

For example, the temporal neighbor block may be a reference block present at a location corresponding to the location [W/2, H/2] of the target block.

In an embodiment, the temporal neighbor block may be determined based on the spatial neighbor block of the target block or the motion information of the spatial neighbor block of the target block. The processing unit may search a reference picture for a block corresponding to the motion information of the spatial neighbor block of the target block, and may determine the found corresponding block to be the temporal neighbor block of the target block.

For example, a block corresponding to the motion information of the L block may be determined to be a temporal neighbor block. The L block may be the lowermost block among blocks adjacent to the left of the target block.

For example, a block corresponding to the motion information of the A block may be determined to be a temporal neighbor block. The A block may be the rightmost block among blocks adjacent to the top of the target block.

The intra-prediction mode of the target block may be derived based on a block spatially adjacent to the temporal neighbor block of the target block. A specific intra-prediction mode of the block spatially adjacent to the temporal neighbor block may be used as the intra-prediction mode of the target block. Here, a method for deriving a block spatially adjacent to the temporal neighbor block may correspond to a method for deriving the spatial neighbor block of the target block.

For example, the intra-prediction mode of a block spatially adjacent to a reference block in a reference slice may be used as the intra-prediction mode of the target block. Alternatively, one or more intra-prediction modes of one or more blocks of R_AL, R_A, R_AR, R_L, and R_LB may be used to derive the intra-prediction mode of the target block.

Derivation of Intra-Prediction Mode Based on Type of Slice

A method for deriving neighbor blocks may be adaptively selected based on the type of a slice. A slice may be a target slice including a target block. In other words, a neighbor block required for the derivation of the intra-prediction mode of the target block may be selected based on the type of the target slice including the target block.

For example, when the target slice is an I slice, the intra-prediction mode of the target block may be derived using the spatial neighbor block of the target block.

For example, when the target slice is a P slice or a B slice, the intra-prediction mode of the target block may be derived using the temporal neighbor block of the target block.

For example, when the target slice is a P slice or a B slice, the intra-prediction mode of the target block may be derived using both the spatial neighbor block and the temporal neighbor block of the target block.

Derivation of Intra-Prediction Mode Using Directionality

The processing unit may detect the directionality of each neighbor block upon deriving the intra-prediction mode of the target block based on the neighbor block, and may use the derived intra-prediction mode based on the detected directionality. Here, "directionality of the neighbor block" may mean the directionality of a picture corresponding to the neighbor block or the directionality of a pixel present in the neighbor block.

Here, the derivation of the intra-prediction mode based on the neighbor block may mean that the intra-prediction mode is derived using information related to the neighbor block.

For example, the neighbor block may include 1) a temporal neighbor block, 2) a spatial neighbor block, and 3) a spatial neighbor block of the temporal neighbor block.

In an embodiment, the directionality of the neighbor block may be detected using the histogram of gradients of samples in the neighbor block.

The histogram of gradients may be derived using the gradient orientation and gradient magnitude of each sample in the neighbor block.

Histogram ranges may be divided into directional modes of intra prediction supported by the encoding apparatus 100 and the decoding apparatus 200. The histogram of gradients may be configured by accumulating gradient magnitudes in histogram ranges matching the gradient orientations of respective samples in the neighbor block.

The gradient orientations and the gradient magnitudes may be calculated using various equations.

For example, each gradient orientation may be calculated using the following Equation (2):

$$\text{Gradient orientation } \theta = \tan^{-1}\frac{dy}{dx} \quad (2)$$

For example, each gradient magnitude may be calculated using the following Equation (3):

$$\text{Gradient magnitude} = \sqrt{dy^2 + dx^2} \quad (3)$$

In Equations (2) and (3), dx and dy may be calculated using the following Equations (4) and (5), respectively.

$$dx = I(x+1,y) - I(x-1,y) \quad (4)$$

$$dy = I(x,y-1) - I(x,y+1) \quad (5)$$

The intra-prediction mode of the neighbor block may be determined based on the accumulated values in the histogram ranges in the histogram of gradients.

The histogram ranges in the histogram of gradients may be sorted depending on the accumulated values. An intra-prediction mode corresponding to N upper ranges, among the sorted histogram ranges, may be used as the intra-prediction mode of the neighbor block.

For example, the histogram of gradients for a neighbor block to which a [−1, H−1] sample belongs may be extracted, and an intra-prediction mode corresponding to a range having the maximum accumulated value in the histogram of gradients may be used as the intra-prediction mode of the target block.

For example, the histogram of gradients for a neighbor block to which a [W−1, −1] sample belongs may be extracted, and an intra-prediction mode corresponding to a range having the maximum accumulated value in the histogram of gradients may be used as the intra-prediction mode of the target block.

Figure 22:
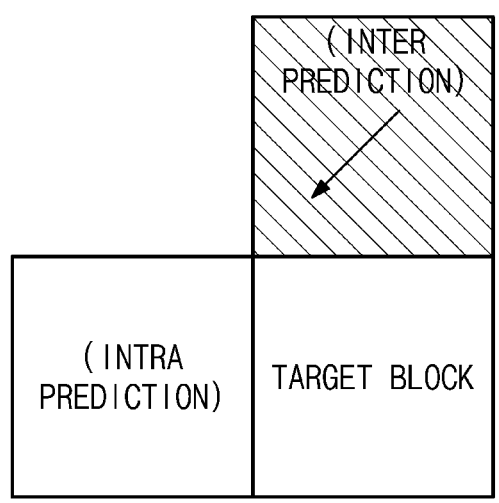
FIG. 22 illustrates derivation of an intra-prediction mode of a target block that uses MPM according to an example.

Configuration of MPM List for Derivation of Intra-Prediction Mode of Target Block FIG. 22 illustrates derivation of an intra-prediction mode of a target block that uses MPM according to an example.

The processing unit may derive the intra-prediction mode of the target block using a Most Probable Mode (MPM) when using the intra-prediction mode of a neighbor block.

An MPM list may be configured to use an MPM. The MPM list may include N candidate modes. N may be a positive integer. The candidate modes in the MPM list may be MPMs.

The number of candidate modes may be set based on coding parameters related to a target block. For example, the number of candidate modes may be set based on at least one of the type of a target slice including the target block, the color component of the target block, the block size of the target block, and the shape of the target block.

Alternatively, the number of candidate modes may be set differently depending on the value of a specific coding parameter related to the target block. For example, the number of candidate modes may be set differently depending on the type of a slice including the target block, the color component of the target block, the block size of the target block, or the shape of the target block.

For example, the number of candidate modes in the MPM list may differ depending on the type of the target slice including the target block. For example, when the target slice is an I slice, the number of candidate modes may be 6. When the target slice is a P slice or a B slice, the number of candidate modes may be 3.

For example, the number of candidate modes in the MPM list may differ depending on the color component of the target block. For example, when the color component of the target block is a luma component, the number of candidate modes may be 6. When the color component of the target block is a chroma component, the number of candidate modes may be 3.

Each of N candidate modes in the MPM list may be an intra-prediction mode derived using a specific scheme.

The candidate modes in the MPM list may be determined based on an intra-prediction mode derived for each neighbor block. Here, the intra-prediction mode derived for the neighbor block may include the intra-prediction mode of the neighbor block. Also, when intra-prediction modes are not used in encoding and/or decoding of the neighbor block, intra-prediction modes of the neighbor block may be derived based on another coding parameter of the neighbor block. For example, the neighbor block may be a block reconstructed via inter prediction, and an intra-prediction mode (to be added to the MPM list) may be derived for the neighbor block reconstructed via inter prediction.

Intra-prediction modes of one or more spatial neighbor blocks may be included as candidate modes in the MPM list.

For example, when an MPM list having six candidate modes is configured, one or more of the intra-prediction modes of the neighbor blocks of the target block illustrated in FIG. 21 may be used as candidate modes in the MPM list.

In an embodiment, one or more of intra-prediction modes of the neighbor blocks of the target block and one or more predefined intra-prediction modes may be set as the candidate modes of the MPM list in a specified order.

For example, the intra-prediction mode of L, the intra-prediction mode of A, a planar mode, a DC mode, the intra-prediction mode of LB, the intra-prediction mode of AR, and the intra-prediction mode of AL may be sequentially added as candidate modes to the MPM list in a certain order. For example, the candidate modes in the MPM list may be the intra-prediction mode of L, the intra-prediction mode of A, a planar mode, a DC mode, the intra-prediction mode of LB, the intra-prediction mode of AR, and the intra-prediction mode of AL.

For example, the intra-prediction mode of A, the intra-prediction mode of L, a planar mode, a DC mode, the intra-prediction mode of AR, the intra-prediction mode of LB, and the intra-prediction mode of AL may be sequentially added as candidate modes to the MPM list in a certain order. Alternatively, the candidate modes in the MPM list may be the intra-prediction mode of A, the intra-prediction mode of L, a planar mode, a DC mode, the intra-prediction mode of AR, the intra-prediction mode of LB, and the intra-prediction mode of AL.

For example, the MPM list may be configured using combinations of one or more intra-prediction modes of one or more spatial neighbor blocks.

In an embodiment, the intra-prediction modes of one or more temporal neighbor blocks may be included as candidate modes in the MPM list. Such a temporal neighbor block may be referred to as a "reference block".

For example, multiple intra-prediction modes of multiple reference blocks may be used as candidate modes in the MPM list. The multiple reference blocks may be present in one or more reference pictures selected from among multiple reference pictures in ascending order of the distance from a target picture including the target block. In other words, the multiple reference blocks may be a predefined number of reference blocks having the shortest distance from the target block among all available reference blocks.

A distance between the target picture and each reference picture may be determined based on the difference between the POC of the target picture and the POC of the reference picture. The distance between the target block and the reference picture may be a distance between the target picture including the target block and the reference picture including the reference block.

In an embodiment, an MPM list having six candidate modes may be configured using the intra-prediction modes of the reference block and the intra-prediction modes of the spatial neighbor blocks of the reference block.

In an embodiment, the intra-prediction mode of the reference block, the intra-prediction modes of one or more spatial neighbor blocks of the reference block, and one or more predefined intra-prediction modes may be set as candidate modes in the MPM list in a specific order.

For example, the intra-prediction mode of the reference block, the intra-prediction mode of R_L, the intra-prediction mode of R_A, a planar mode, a DC mode, the intra-prediction mode of R_LB, the intra-prediction mode of R_AR, and the intra-prediction mode of R_AL may be sequentially added as candidate modes to the MPM list in a certain order. Alternatively, the candidate modes of the MPM list may include the intra-prediction mode of the reference block, the intra-prediction mode of R_L, the intra-prediction mode of R_A, a planar mode, a DC mode, the intra-prediction mode of R_LB, the intra-prediction mode of R_AR, and the intra-prediction mode of R_AL.

For example, the MPM list may be configured using combinations of one or more intra-prediction modes of one or more temporal neighbor blocks.

In an embodiment, when the MPM list having six candidate modes is configured, intra-prediction modes of the spatial neighbor blocks of the target block and the intra-prediction mode of the reference block may be used. The reference block may be a temporal neighbor block.

In an embodiment, the intra-prediction mode of the spatial neighbor block of the target block, the intra-prediction mode of the reference block, and one or more predefined intra-prediction modes may be set as candidate modes in the MPM list in a specific order.

For example, the intra-prediction mode of the reference block, the intra-prediction mode of L, the intra-prediction mode of A, a planar mode, a DC mode, the intra-prediction mode of LB, the intra-prediction mode of AR, and the intra-prediction mode of AL may be sequentially added as candidate modes to the MPM list in a certain order. Alternatively, the candidate modes of the MPM list may include the intra-prediction mode of the reference block, the intra-prediction mode of L, the intra-prediction mode of A, a planar mode, a DC mode, the intra-prediction mode of LB, the intra-prediction mode of AR, and the intra-prediction mode of AL.

When the intra-prediction mode of the spatial neighbor block is not present, the intra-prediction mode of the reference block present at the same location as the spatial neighbor block may replace the intra-prediction mode of the spatial neighbor block. The reference block may be a block in a reference picture. The location of the reference block in the reference picture may be the same as that of the spatial neighbor block in the target picture.

Alternatively, when the intra-prediction mode of the spatial neighbor block is not present, the intra-prediction mode of the reference block corresponding to the motion information of the spatial neighbor block may replace the intra-prediction mode of the spatial neighbor block.

In an embodiment, the MPM list may be configured using combinations of one or more intra-prediction modes of one or more spatial neighbor blocks and one or more temporal neighbor blocks.

In the methods in the above-described embodiments, an intra-prediction mode already existing in the MPM list may not be added again to the MPM list. In other words, the candidate modes in the MPM list may not overlap each other. When the intra-prediction modes of specific entities, such as a spatial neighbor block and a temporal neighbor block, are identical to candidate modes previously inserted into the MPM list, the intra-prediction modes of the entities may not be added to the MPM list.

When the MPM list is not completely populated using the methods according to the above-described embodiments or other methods, the MPM list may be additionally populated with corresponding modes based on directional modes already included in the MPM list. That is, when the number of candidate modes in the MPM list is less than the predefined number of candidate modes, intra-prediction modes to be added to the MPM list may be generated based on the intra-prediction modes included in the MPM list. Here, each of the intra-prediction modes included in the MPM list and the intra-prediction modes to be added to the MPM list may be a directional mode.

For example, a directional mode, in which 1 is added to the directional mode already included in the MPM list, and/or a directional mode, in which 1 is subtracted from the directional mode already included in the MPM list, may be added to the MPM list.

Alternatively, when the MPM list is not completely populated using the methods in the above-described embodiments or other methods, a predefined intra-prediction mode may be added to the MPM list. In other words, when the number of candidate modes included in the MPM list is less than the predefined number of candidate modes, a predefined number of intra-prediction modes identical to the number of missing intra-prediction modes may be added to the MPM list.

For example, the predefined intra-prediction modes may be one or more of a horizontal mode, a vertical mode, a 45° mode, a 135° mode, and a 235° mode.

By means of the above-described addition, the MPM list may be populated with a predefined number of candidate modes.

When the MPM list is configured, the intra-prediction mode of a neighbor block may be derived using the directionality of the neighbor block. For example, the intra-prediction mode of the neighbor block, derived using the directionality of the neighbor block, may be added to the MPM list, and may be used to generate the candidate modes of the MPM list.

For example, when the prediction mode of the spatial neighbor block of the target block is an inter-prediction mode, the directionality of the spatial neighbor block may be detected, and the intra-prediction mode of the spatial neighbor block may be derived based on the detected directionality.

Multiple MPM Lists

The number of MPM lists may be plural. For example, three MPM lists, that is, a first MPM list, a second MPM list, and a third MPM list, may be configured. Here, an intra-prediction mode included in a single MPM list may not overlap intra-prediction modes in other MPM lists. In other words, when the MPM list is configured, an intra-prediction mode already added to the MPM list or an intra-prediction mode added to an additional MPM list that has been previously configured may not be again added to the MPM list.

Specific information related to the MPM list may be used in order to use the MPM list.

An MPM list validity indicator may indicate whether the same mode as the intra-prediction mode of a target block is present in the MPM list. The MPM list validity indicator may be signaled from the encoding apparatus 100 to the decoding apparatus 200.

When the MPM list validity indicator indicates that the same mode as the intra-prediction mode of the target block is present in the MPM list, the intra-prediction mode of the target block may be derived using the MPM list, an MPM indicator, etc. The MPM indicator may be signaled from the encoding apparatus 100 to the decoding apparatus 200.

When the MPM list validity indicator indicates that that the same mode as the intra-prediction mode of the target block is not present in the MPM list, an additional intra-prediction mode other than the candidate modes of the MPM list may be used as the intra-prediction mode of the target block. In order to derive the additional intra-prediction mode, the MPM list and information related to the MPM list may be used. For example, information indicating the intra-prediction mode of the target block may be separately encoded and/or decoded. Such information may include information such as an additional list and an index for specifying the intra-prediction mode of the target block. Through the encoding and/or decoding of this information, the intra-prediction mode of the target block may be derived.

Also, when the intra-prediction mode of the target block is derived, intra-prediction modes not included in the MPM list may be sorted using a specific scheme. For example, intra-prediction modes not included in the MPM list may be sorted in ascending order or descending order depending on a specific reference value. For example, the specific reference value may be the number of intra prediction.

When there are two or more MPM lists, if the MPM list validity indicator indicates that the same intra-prediction mode as the intra-prediction mode of the target block is not present in the first MPM list, whether the same intra-prediction mode as the intra-prediction mode of the target block is present in the second MPM list may be determined. If it is determined that the same intra-prediction mode as the intra-prediction mode of the target block is present in the second MPM list, the intra-prediction mode present in the second MPM list may be used as the intra-prediction mode of the target block. If it is determined that the same intra-prediction mode as the intra-prediction mode of the target block is not present in the second MPM list, whether the same intra-prediction mode as the intra-prediction mode of the target block is not present in a subsequent MPM list, such as the third MPM list or a fourth MPM list, may be additionally determined.

In an embodiment, a specific candidate mode of the derived MPM list may be used as the intra-prediction mode of the target block. For example, a first candidate mode in the MPM list may be used as the intra-prediction mode of the target block.

In an embodiment, the MPM index, such as the MPM indicator, may indicate a specific candidate mode in the MPM list. The MPM index may be signaled from the encoding apparatus 100 to the decoding apparatus 200. The decoding apparatus 200 may use a candidate mode indicated by the MPM index as the intra-prediction mode of the target block.

Division of Block and Use of MPM List for Divided Block

When an MPM list is configured, a single MPM list may be configured for a specific block size. In other words, the unit by which the MPM list is configured may be a block having a specific block size. When the block having the specific block size is divided into multiple sub-blocks, the MPM list configured for the block having the specific block size may be used for each of the sub-blocks generated from the division. The configured MPM list may be used in common for the sub-blocks included in the block having the specific block size.

For example, when the block size of the target block is a specific block size, the MPM list may be configured for the target block. When the target block is divided into multiple sub-blocks, an MPM list configured for each of the multiple sub-blocks generated by dividing the target block may be used, and intra-prediction modes of respective sub-blocks may be derived using the configured MPM lists.

For example, when the block size of the target block is 8×8 and block sizes of four sub-blocks are 4×4, an MPM list for the 8×8 block may be configured, after which MPM lists configured for respective 4×4 blocks may be used (in common).

In the case where each MPM list is configured, when the target block having a specific block size is divided into multiple sub-blocks, MPM lists for respective multiple sub-blocks may be configured based on the target block. Here, the MPM lists may be configured either simultaneously or in parallel. In other words, the MPM list for the target block including the multiple sub-blocks may be configured for each of the multiple sub-blocks. Alternatively, MPM lists for multiple sub-blocks may be configured using information derived based on the target block including multiple sub-blocks. Here, the information derived based on the target block may include information about neighbor blocks of the target block and coding parameters related to the target block.

For example, when the block size of the target block is a specific block size, an MPM list for each sub-block in the target block may be configured using the intra-prediction mode of the neighbor block of the target block.

For example, when the block size of the target block is 8×8 and the block sizes of four sub-blocks are 4×4, MPM lists may be respectively configured for the four sub-blocks, and the MPM lists may be simultaneously configured using the intra-prediction mode of the neighbor block of the target block.

Derivation of Intra-Prediction Modes of Sub-Blocks

Figure 23:
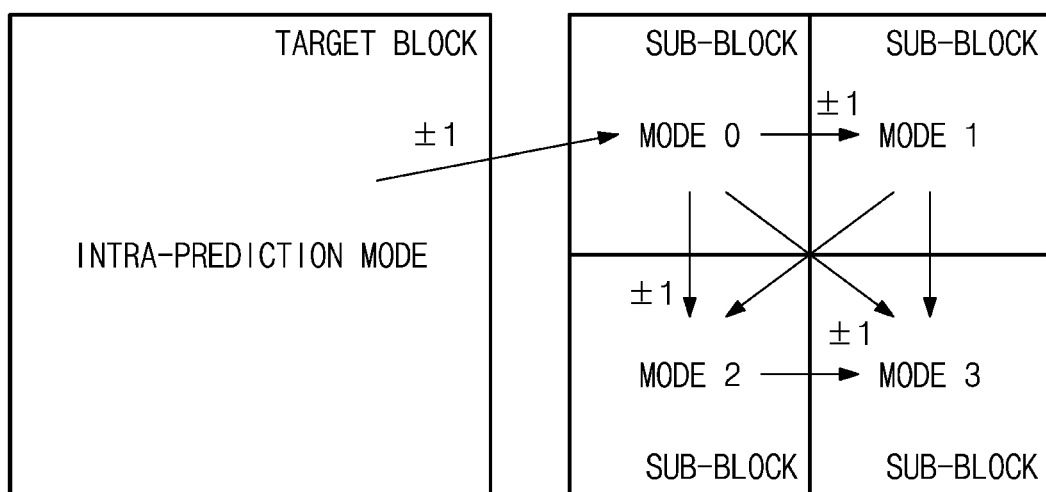
FIG. 23 illustrates derivation of intra-prediction modes of sub-blocks according to an example.

FIG. 23 illustrates derivation of intra-prediction modes of sub-blocks according to an example.

In FIG. 23, it is illustrated that mode 0, mode 1, mode 2, and mode 3 are derived as intra-prediction modes of four blocks generated by dividing a target block. In FIG. 23, arrows may indicate dependency relationships when intra-prediction modes are derived.

When intra-prediction modes are derived based on neighbor blocks, the unit of derivation of intra-prediction modes may be a sub-block. In other words, when intra-prediction modes are derived based on the neighbor block of the target block, intra-prediction modes may be derived for sub-blocks of the target block.

The block size of the target block may be W×H, and the block size of each of sub-blocks generated by dividing the target block may be N×M. N may be a positive integer less than W, and M may be a positive integer less than H. Each of N and M may have a value of $2^n$. Here, N may be an integer of 1 or more.

The multiple sub-blocks generated by dividing the target block may have different intra-prediction modes.

The intra-prediction modes of the sub-blocks may be derived using the method for deriving intra-prediction modes for the unit of the above-described block.

The list of intra-prediction mode of the corresponding sub-block may be configured using an additional sub-block neighboring the corresponding sub-block. Here, the list may be an MPM list. The number of candidate modes in the list may be N. N may be a positive integer. Below, the additional sub-block neighboring the sub-block may be referred to as a "neighbor sub-block".

The intra-prediction mode of each sub-block of the target block may be derived using intra-prediction modes falling within the range from a positive (+) offset to a negative (−) offset for the intra-prediction mode of the neighbor sub-block. Here, the offset may be a positive integer. That is, the list of sub-blocks of the target block may include intra-prediction modes falling within a specific range for the intra-prediction mode of the neighbor sub-block. The lower limit of the specific range may be a value obtained by subtracting the offset from the intra-prediction mode of the neighbor block. The upper limit of the specific range may be a value obtained by adding the offset to the intra-prediction mode of the neighbor block.

For example, when the value of the offset is 2, a list of the sub-blocks may be configured using intra-prediction modes falling within the range of the offset of 2 from the intra-prediction mode of a sub-block to the left of the sub-block.

For example, when the intra-prediction mode of the sub-block to the left of the sub-block is 7, intra-prediction modes 5, 6, 7, 8, and 9 may be added to the list of the sub-blocks.

For example, when the value of the offset is 1, a list of the sub-blocks may be configured using intra-prediction modes falling within the range of the offset of 1 from the intra-prediction mode of a sub-block above the sub-block.

In an embodiment, the processing unit may finally select the intra-prediction mode of the sub-block by comparing the costs of the candidate modes with each other. Here, the comparison of costs may be performed using one or more of the Sum of Absolute Differences (SAD), the Sum of Absolute Transformed Differences (SATD), and rate-distortion costs.

The processing unit may perform, in parallel, the derivation of an intra-prediction mode using a sub-block as a unit and intra prediction using the derived intra-prediction mode. In detail, the processing unit may perform, in parallel, operations of deriving intra-prediction modes of multiple sub-blocks and operations for intra predictions.

When the intra-prediction mode of the sub-block is derived, a specific additional sub-block may be referred to. Here, reference to the specific additional sub-block may mean that the intra-prediction mode of the specific additional sub-block is used to derive the intra-prediction mode of the sub-block.

Figure 24:
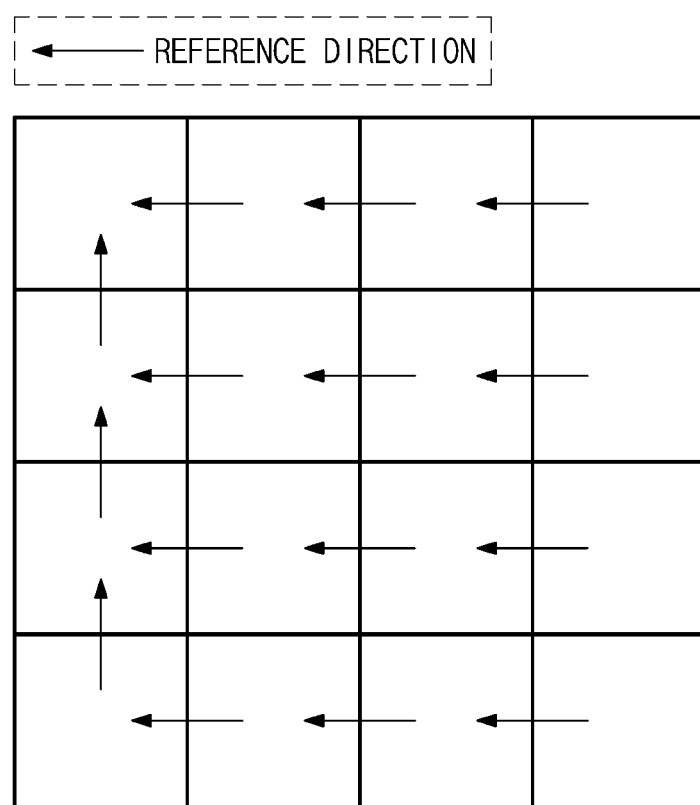
FIG. 24 illustrates derivation of intra-prediction modes of sub-blocks that use a first reference direction according to an example.

FIG. 24 illustrates derivation of intra-prediction modes of sub-blocks that use a first reference direction according to an example.

In an embodiment, as illustrated in FIG. 24, when the intra-prediction mode of a sub-block is derived, an additional sub-block present in the same row as the sub-block may be referred to. When the sub-block is the leftmost sub-block, an additional sub-block in another row adjacent to the sub-block may be referred to. Alternatively, when the sub-block is the leftmost sub-block, a target block including the sub-block may be referred to. When sub-block is a leftmost and uppermost sub-block, a target block including the sub-block may be referred to.

For example, when the intra-prediction mode of the sub-block is derived, the sub-block to the left of the sub-block (hereinafter also referred to as "left sub-block") may be referred to. When the sub-block is the leftmost sub-block, a sub-block above the sub-block (hereinafter also referred to as an "above sub-block") may be referred to. Alternatively, when the sub-block is the leftmost sub-block, a target block including the sub-block may be referred to.

In other words, when intra-prediction modes using the first reference direction are derived, the left sub-block may be primarily referred to, and the above sub-block may be referred to when the left sub-block is not available.

Figure 25:
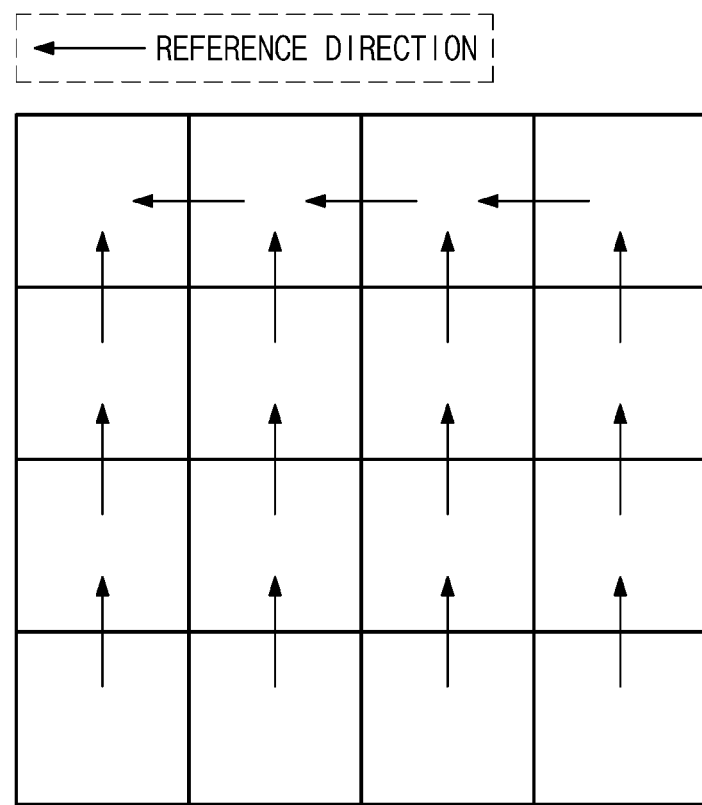
FIG. 25 illustrates derivation of intra-prediction modes of sub-blocks that use a second reference direction according to an example.

FIG. 25 illustrates derivation of intra-prediction modes of sub-blocks that use a second reference direction according to an example.

In an embodiment, as illustrated in FIG. 25, when the intra-prediction mode of a sub-block is derived, an additional sub-block present in the same column as the sub-block may be referred to. When the sub-block is the uppermost sub-block, an additional sub-block in another column adjacent to the sub-block may be referred to. Alternatively, when the sub-block is the uppermost sub-block, a target block including the sub-block may be referred to. When sub-block is a leftmost and uppermost sub-block, a target block including the sub-block may be referred to.

For example, when intra-prediction mode of the sub-block is derived, a sub-block above the corresponding sub-block (above sub-block) may be referred to. When the sub-block is the uppermost sub-block, a sub-block to the left of the corresponding sub-block (left sub-block) may be referred to. Alternatively, when the sub-block is the uppermost sub-block, a target block including the sub-block may be referred to.

In other words, when intra-prediction modes using the second reference direction are derived, an above sub-block may be primarily referred to, and a left sub-block may be referred to when the above sub-block is not available.

Derivation of Intra-Prediction Mode of Target Block Using Encoding and/or Decoding of Intra-Prediction Mode When the intra-prediction mode of a target block is encoded and decoded, entropy encoding and entropy decoding may be performed on a block basis.

In order to derive the intra-prediction mode, information about intra prediction for the target block may be signaled from the encoding apparatus 100 to the decoding apparatus 200.

In an embodiment, the information about the intra prediction for the target block may include one or more of the following pieces of information. Below, a target may be the unit of prediction. Also, the target may indicate a target block or a sub-block.

Flag indicating a prediction method for the target

Flag indicating whether a Most Probable Mode (MPM) matches the target (e.g. this flag may be called "prev_intra_luma_pred_flag".)

Index designating the location of a candidate mode to be used for the target in an MPM list (e.g. this index is called "mpm_idx".)

Flag indicating whether the intra-prediction mode of the target belongs to a non-MPM selected mode set, among intra-prediction modes that do not belong to MPMs (e.g. this flag may be called "selected_mode_set_flag".)

Index indicating a mode to be used for the target in the non-MPM selected mode set (e.g. this index may be called "selected_mode_idx".)

Index indicating a mode to be used for the target among non-MPM non-selected modes (e.g. this index may be called "non_selected_mode_idx".)

Information indicating an intra-prediction mode for a luma component (e.g. this information may be called "rem_intra_luma_pred_mode".)

Information indicating an intra-prediction mode for a chroma component (e.g. this information may be called "intra_chroma_pred_mode".)

Flag indicating that the intra-prediction mode of a target is derived using the intra-prediction mode of a neighbor block (e.g. this flag may be called "NDIP_flag".)

In order to derive intra-prediction modes, information about the intra prediction for the target block may be signaled from the encoding apparatus 100 to the decoding apparatus 200.

In an embodiment, the information about the intra prediction for a sub-block may include one or more of the following pieces of information.

Information about intra prediction for a sub-block may include information about the intra prediction for the above-described target block.

Flag indicating the direction to a reference sub-block (e.g. leftward and upward directions)

Index designating the location in a sub-block list of a candidate sub-block to be used for intra prediction, among candidate sub-blocks in the sub-block list At least one of information about the intra prediction for the above-described target block and/or information about the intra prediction for the sub-block may be selectively signaled. Whether at least one piece of information is to be signaled may be determined based on coding parameters related to the target block and/or the sub-block.

For example, whether at least one piece of information is to be signaled may be determined based on the type of a target slice, the block size of a target block, the block size of a sub-block, the shape of the target block, the shape of the sub-block, the division information of the target block, etc. The division information of the target block may indicate whether the target block is divided into sub-blocks.

For example, when the block size of the target block is a specific block size, at least one of pieces of information about intra prediction for the target block may not be signaled, and information about intra prediction for an additional block that has been previously encoded and/or decoded may be used for intra prediction for the target block. The additional block may be an upper block of the target block.

For example, when the shape of the target block is a rectangular shape, at least one of pieces of information about intra prediction for the target block may not be signaled, and information about intra prediction for an additional block that has been previously encoded and/or decoded may be used. The additional block may be the upper block of the target block.

For example, at least one of pieces of information about intra prediction for the target block may not be signaled based on the division information of the target block. For example, when the target block is divided into multiple sub-blocks, a flag indicating whether an MPM matches the target (block) may not be signaled. Alternatively, the flag indicating whether an MPM matches the target (block) may be signaled when the target block is divided into multiple sub-blocks. In this case, the division information of the target block may indicate that the target block is divided into sub-blocks.

When the above-described intra prediction information is entropy-encoded and/or entropy-decoded, at least one of the following binarization methods may be used.

Truncated Rice binarization method

K-th order Exp-Golomb binarization method

Limited K-th order Exp-Golomb binarization method

Fixed-length binarization method

Unary binarization method

Truncated unary binarization method

Truncated binary binarization method

Configuration of Reference Sample for Intra Prediction for Target Block

Figure 26:
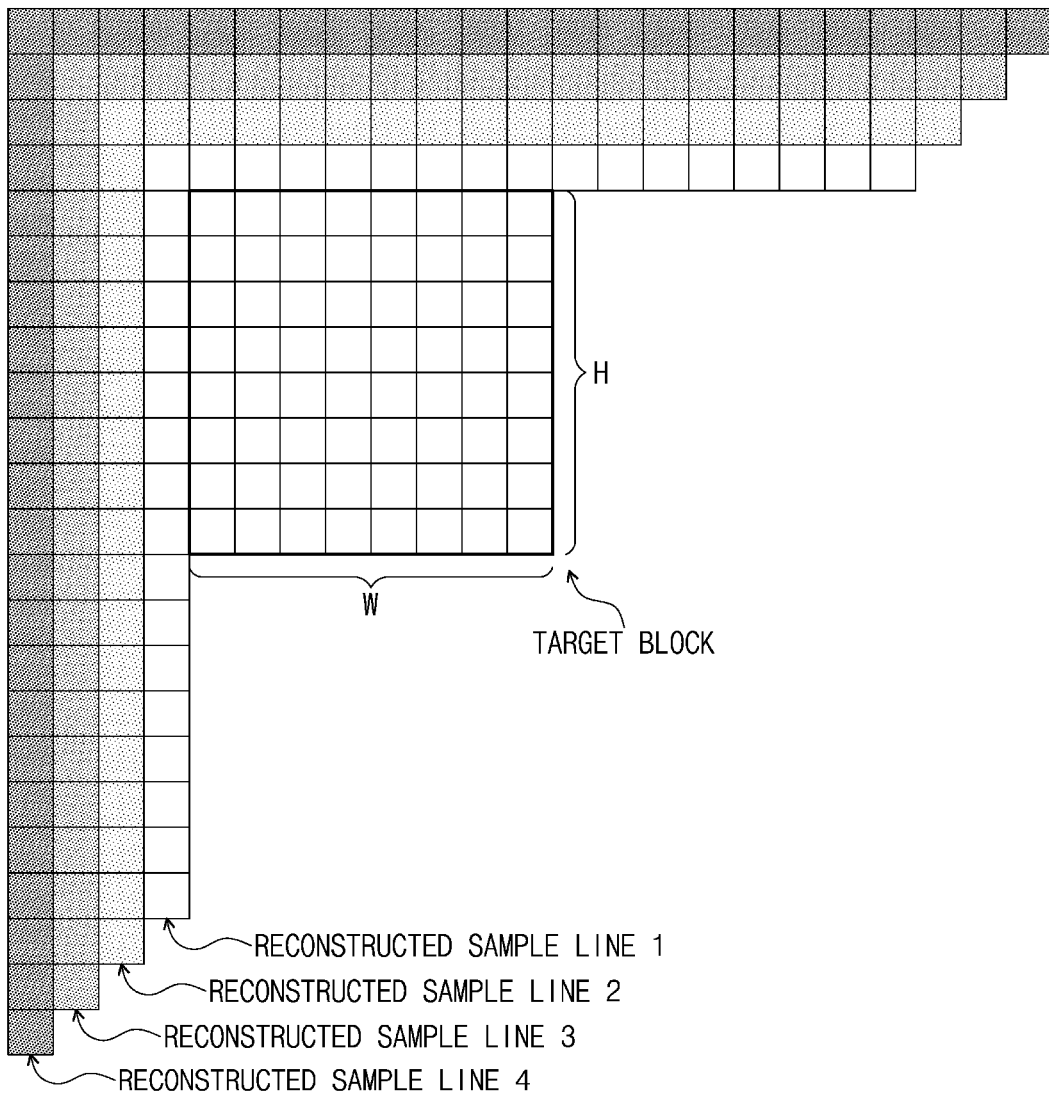
FIG. 26 illustrates reconstructed sample lines for a target block according to an example.

FIG. 26 illustrates reconstructed sample lines for a target block according to an example.

In FIG. 26, reconstructed sample line 1, reconstructed sample line 2, reconstructed sample line 3, and reconstructed sample line 4 are depicted as multiple reconstructed sample lines.

The horizontal size and vertical size of a target block may be W and H, respectively. The coordinates of an upper-left portion of the target block or the coordinates of an upper-left sample of the target block may be (0, 0).

The relative location of an above-left reference sample closest to the location of the upper-left sample of the target block may be set to coordinates (−1, −1).

When the coordinates of the upper-left portion of the target block are (0, 0), the reconstructed sample line 1 may be a line of reconstructed samples having an x coordinate value of −1 or a y coordinate value of −1. The reconstructed sample line 2 may be a line of reconstructed samples having an x coordinate value of −2 or a y coordinate value of −2. The reconstructed sample line 3 may be a line of reconstructed samples having an x coordinate value of −3 or a y coordinate value of −3. The reconstructed sample line 4 may be a line of reconstructed samples having an x coordinate value of −4 or a y coordinate value of −4. In other words, as illustrated in FIG. 26, the target block, the reconstructed sample line 1, the reconstructed sample line 2, the reconstructed sample line 3, and the reconstructed sample line 4 may be sequentially adjacent to the target block.

Based on the intra-prediction mode derived in the above-described manner, a reference sample to be used for intra prediction for a target block or a sub-block may be configured. Hereinafter, the term "target block" may also denote the sub-block of the target block.

The reference sample may be configured using one or more reconstructed samples neighboring the target block or a combination of the one or more reconstructed samples. Further, filtering may be applied to the configured reference samples.

Here, reconstructed samples on multiple reconstructed sample lines may be used without change as reference samples for intra prediction. Alternatively, reference samples may be configured by filtering reconstructed samples on a single reconstructed sample line. Alternatively, reference samples may be configured by filtering reconstructed samples on different reconstructed sample lines.

Each reference sample configured in this way may be represented by "ref[m, n]". A reconstructed sample or a filtered reconstructed sample that is adjacent to the target block may be represented by "rec[m, n]". Here, m and n may be integers indicating the coordinates of the corresponding sample.

In an embodiment, reference samples may be configured using one or more reconstructed sample lines adjacent to the target block.

For example, at least one reconstructed sample line may be selected from among multiple reconstructed sample lines, illustrated in FIG. 26, and reference samples may be configured using the selected reconstructed sample line. An indicator for the selected reconstructed sample line may be signaled from the encoding apparatus 100 to the decoding apparatus 200.

For example, the reference samples may be configured using a combination of one or more of the multiple reconstructed sample lines, illustrated in FIG. 26.

For example, as shown in Equation (6), (7), or (8), a reference sample may be configured using a weighed sum. Weights to be assigned may be set depending on the distances between the reconstructed samples and the target block.

$$\text{ref}[-1,-1] = (\text{rec}[-2,-1] + 2*\text{rec}[-1,-1] + \text{rec}[-1,-2] + 2) >> 2 \quad (6)$$

$$\text{ref}[x,-1] = (\text{rec}[x,-2] + 3*\text{rec}[x,-1] + 2) >> 2, \ (x=0 \sim 2*W-1) \quad (7)$$

$$\text{ref}[-1,y] = (\text{rec}[-2,y] + 3*\text{rec}[-1,y] + 2) >> 2, \ (y=0 \sim 2*H-1) \quad (8)$$

For example, the reference sample may be configured by calculating at least one of the average value, maximum value, minimum value, and median value of multiple reconstructed samples, based on at least one of the distance from the target block and an intra-prediction mode.

When reference samples are configured through this procedure, the number of lines of the configured reference samples may be one or more.

In an embodiment, a method for configuring reference samples above the target block and a method for configuring reference samples to the left of the target block may be different from each other.

In an embodiment, information about the reference samples may be signaled from the encoding apparatus 100 to the decoding apparatus 200.

The information about the reference samples may indicate which one of the above-described reference sample generation methods has been used.

For example, the information about the reference samples may indicate whether multiple reconstructed sample lines have been used to generate the reference samples.

Availability of Reference Samples

Figure 27:
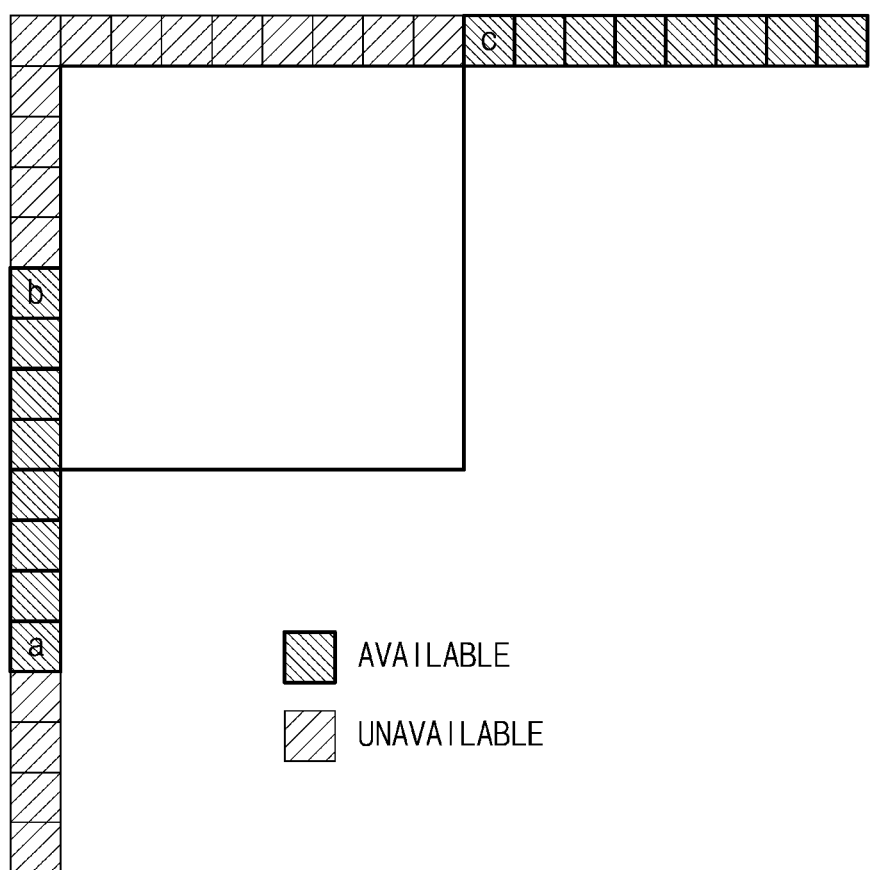
FIG. 27 illustrates the availability of reference samples according to an example.

FIG. 27 illustrates the availability of reference samples according to an example.

In FIG. 27, reconstructed samples for a target block are separated into available samples and unavailable samples. In FIG. 27, 'a', 'b' and 'c' denote the values of respective samples.

The availability of reconstructed samples neighboring the target block used to configure reference samples may be determined. The available samples may be samples that can be used to configure reference samples. The unavailable samples may be samples that cannot be used to configure reference samples.

For example, when a certain reconstructed sample is located outside at least one of the area of a picture including a target block, the area of a slice, the area of a tile, and the area of a CTU, it may be determined that the reconstructed sample is unavailable.

For example, when constrained intra prediction is performed for the target block and a reconstructed sample neighboring the target block is located inside a block that is encoded and/or decoded via inter prediction, it may be determined that the reconstructed sample is unavailable.

When reconstructed samples are unavailable, available reconstructed samples adjacent to the unavailable reconstructed samples may replace the unavailable reconstructed samples. The available reconstructed samples may be plural.

For example, as illustrated in FIG. 27, when available samples and unavailable samples coexist, regions of the unavailable samples may be populated using at least one of the following methods.

Each unavailable sample may be a sample, the value of which is not set or which cannot be set. Populating the unavailable sample may mean that the value of the unavailable sample is set (so that the unavailable sample is usable for intra prediction for the target block). For example, populating the unavailable sample with a specific value may mean that the specific value is used as the value of the unavailable sample. By populating each unavailable sample with the specific value, the value of a sample (for intra prediction or the like of the target block) may be specified, and the unavailable sample may become available (at least for intra prediction for the target block).

For example, unavailable samples may be populated with available samples while starting at location '0', which is the location of the lowermost left sample. That is, the first four unavailable samples from the lowermost left portion may be populated with a value of 'a', and the next 13 unavailable samples may be populated with a value of 'b'.

For example, unavailable samples may be populated with certain values using a combination of available samples.

For example, unavailable samples may be populated with the average value of available samples respectively located at both ends of the corresponding unavailable samples. That is, the first four unavailable samples from the lowermost left portion may be populated with a value of 'a', and the next 13 unavailable samples may be populated with the average of 'b' and 'c'.

Filtering of Reference Samples

Whether to apply filtering may be determined for one or more reference samples configured in the above-described manner.

In an embodiment, whether to apply filtering may be determined based on one or more of the intra-prediction mode of the target block, the block size of the target block, and the shape of the target block. When the shape of the target block is used, the width and height of the target block may be compared with each other and whether to apply filtering may be determined based on the result of the comparison. For example, when the width of the target block is equal to or greater than the height of the target block, filtering may be applied. Alternatively, when the intra-prediction mode of the target block is a predetermined mode, whether to apply filtering may be determined based on the shape of the target block. For example, when the intra-prediction mode of the target block is an above-right diagonal mode (e.g. mode 34 described above with reference to FIG. 7), filtering may be applied when the width of the target block is equal to or greater than the height of the target block.

When filtering is to be applied, the type of a filter may be determined based on one or more of the intra-prediction mode of the target block, the block size of the target block, and the shape of the target block.

For example, at least one of a 3-tap filter, a 5-tap filter, and a 7-tap filter may be selected based on one or more of the intra-prediction mode of the target block, the block size of the target block, and the shape of the target block.

For example, whether to apply filtering may be determined differently for respective multiple reference sample lines. Based on specific information, whether to apply filtering may be determined differently for each of the multiple reference sample lines. For example, filtering may be applied to a first reference sample line adjacent to the target block, and filtering may not be applied to a second reference sample or to the remaining reference sample lines.

In an example, filtering may be applied to a reference sample line adjacent to the target block, among the multiple reference sample lines.

In an example, filtering may be applied to a reference sample line adjacent to the target block, among the multiple reference sample lines, and filtering may not be applied to the remaining reference sample lines. Alternatively, filtering may be applied to a reference sample line closest to the target block, among the multiple reference sample lines, and filtering may not be applied to the remaining reference sample lines.

For example, in intra prediction for the target block, the values of reference samples to which filtering is applied and the values of reference samples to which filtering is not applied may be used together.

Performance of Intra Prediction

Intra prediction for a target block or a sub-block may be performed based on a derived intra-prediction mode and a reference sample. Hereinafter, the term "target block" may also denote a sub-block.

For example, non-directional intra prediction for the target block may be performed. Here, a non-directional mode may be one of a DC mode and a planar mode.

In an embodiment, intra prediction in the DC mode may be performed using the average of one or more of configured reference samples. Here, filtering may be applied to one or more prediction samples located at the boundary of the target block. Intra prediction in the DC mode may be performed differently based on at least one of the block size of the target block and the shape of the target block.

In an embodiment, intra prediction in a planar mode may be performed using a weighed sum in which the distance from a reference sample is taken into consideration depending on the location of the prediction sample in the target block.

In an embodiment, directional intra prediction for the target block may be performed. A directional mode may be one of a horizontal mode, a vertical mode, and a mode having a specific angle.

For example, intra prediction in the horizontal mode may be performed using one or more reference samples present in a horizontal line at the location at which a prediction sample is disposed.

For example, intra prediction in the vertical mode may be performed using one or more reference samples present in a vertical line at the location at which a prediction sample is disposed.

For example, intra prediction in the mode having a specific angle may be performed using one or more reference samples, present in a line having a specific angle at the location at which a prediction sample is disposed, and one or more reference samples present near the line having the specific angle. Here, the number of reference samples used may be N, where N may be 2, 3, 4, 5, or 6. Further, intra prediction may be performed using an N-tap filter. The N-tap filter may be a 2-tap filter, a 3-tap filter, a 4-tap filter, a 5-tap filter or a 6-tap filter.

In an embodiment, intra prediction for the target block may be performed based on location information. The location information may be signaled from the encoding apparatus 100 to the decoding apparatus 200. A block including reconstructed samples present at the location indicated by the location information may be used as a prediction block for intra prediction for the target block. Alternatively, the decoding apparatus 100 may search for a block similar to the target block, and may use the found block as a prediction block for intra prediction for the target block.

In an embodiment, in intra prediction for the target block, inter-color prediction may be performed.

In an example, intra prediction for a chroma component of the target block may be performed using a reconstructed luma component of the target block. Further, intra prediction for a second chroma component of the target block may be performed using a reconstructed first chroma component of the target block. For example, the first chroma component may be Cb. The second chroma component may be Cr.

In intra prediction for the target block, the above-described intra prediction methods may be combined with each other. For example, in intra prediction for the target block, one or more intra-prediction modes may be combined with each other. Here, the combination of one or more intra-prediction modes may mean that a prediction block for the target block is generated based on blocks generated in one or more intra-prediction modes.

For example, the prediction block for the target block may be configured using a weighted sum of a block generated using a specific non-directional mode and a block generated using a specific directional mode. Here, weights may be set based on one or more of the intra-prediction mode of the target block, the block size of the target block, and the location of a prediction sample in the prediction block.

For example, when one or more intra-prediction modes are combined with each other, the prediction block may be configured using a weighted sum of a value that is generated using the intra-prediction mode of the target block and a value that is generated using a specific intra-prediction mode in an MPM list.

In an embodiment, intra prediction for the target block may be performed using one or more reference sample sets.

For example, the prediction block may be configured using a weighted sum of a block generated via intra prediction that uses a reference sample to which filtering is not applied and a block generated via intra prediction that uses a reference sample to which filtering is applied.

When intra prediction for the target block is performed, filtering using a reconstructed sample adjacent to the target block may be performed. Here, whether to perform filtering may be determined based on one or more of the intra-prediction mode of the target block, the block size of the target block, and the shape of the target block.

Such filtering may be included in a process for intra prediction, and may be performed as one of steps of intra prediction.

When filtering is performed, at least one of a filter tap for filtering, the number of lines to which filtering is to be applied, and the number of samples to which filtering is to be applied may be determined based on one or more of the intra-prediction mode of the target block, the block size of the target block, and the shape of the target block.

In an embodiment, N directional modes may be used for intra prediction for the target block. N may be a positive integer, for example, 33, 65, or the like. Each directional mode may indicate a specific angle.

Reconfiguration of Reference Sample for Intra Prediction

Figure 28:
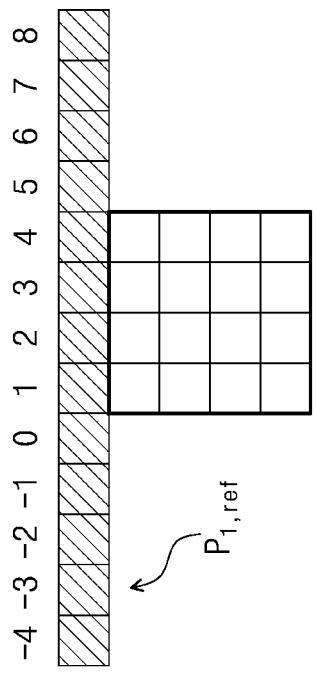
FIG. 28 illustrates reconfiguration of reference samples according to an example.
Figure 28:
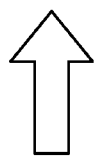
Figure 28:
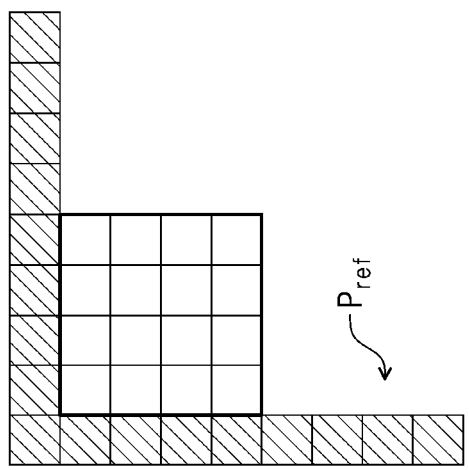

FIG. 28 illustrates reconfiguration of a reference sample according to an example.

When directional intra prediction is performed, a reference sample configured depending on a directional mode may be reconfigured.

For example, when the directional mode uses all of reference samples disposed above a target block (i.e. above reference samples) and reference samples to the left of the target block (i.e. left reference samples), the left reference samples and/or the above reference samples may be reconfigured as a one-dimensional (1D) array.

For example, in FIG. 28, one or more of the reference samples to the left of the target block may be reconfigured as a 1D array of the reference samples above the target block. In other words, one or more of the reference samples to the left of the target block may be converted into a part of the 1D array of the reference samples above the target block. Alternatively, one or more of the reference samples to the left of the target block may be configured as a part of the reference samples above the target block.

Here, of the left reference samples, samples used to configure the above reference samples may be determined differently depending on the directional mode.

For example, the above reference samples may be configured by moving one or more of the left reference samples. Alternatively, the above reference samples may be configured using a weighted sum of one or more of the left reference samples.

When directional intra prediction is performed, real-number-based interpolated prediction may be performed.

For example, an offset and a weight required for interpolation of prediction samples depending on the locations of samples in the target block may be set based on an angular parameter corresponding to a directional mode (i.e. the value of "intraPredAngle").

For example, when interpolation based on a unit of a $\frac{1}{32}$ pixel (pel) is used, the offset may be set using the following Equation (9), and the weight may be set using the following Equation (10) in a directional mode corresponding to a vertical direction.

$$iIdx = ((y+1) * intraPredAngle) >> 5 \quad (9)$$

"iIdx" may denote an offset.

"intraPredAngle" may denote the angle of intra prediction.

$$iFact = ((y+1) * intraPredAngle) \& 31 \quad (10)$$

"iFact" may denote a weight.

The value of a prediction sample may be determined differently depending on the value of iFact.

For example, when the value of iFact is not '0', the location of prediction for reference sample $P_{1,ref}$ may be the location of a real number rather than the location of an integer unit (i.e. a full sample location). As shown in the following Equation (11), the value of the prediction sample at coordinates (x, y) may be generated using two reference samples respectively adjacent to the left and right of the real number location.

$$predSamples[x][y] = ((32 - iFact) * p_{1,ref}[x + iIdx + 1] + iFact * p_{1,ref}[x + iIdx + 2] + 16) >> 5 \quad (11)$$

"predSamples[x][y]" may denote the value of the prediction sample at coordinates (x, y).

For example, when the value of iFact is 0, the value of the prediction sample may be generated using the following Equation (12):

$$predSamples[x][y] = p_{1,ref}[x + iIdx + 1] \quad (12)$$

For at least one of the horizontal mode and the vertical mode of directional prediction modes, filtering may not be performed on the reference sample, and interpolated prediction may not be required for the reference sample. Further, in the horizontal mode or the vertical mode, intra prediction for the target block may be performed using only the reference samples above the target block or only the reference samples to the left of the target block, and thus a procedure for reconfiguring specific reference samples as a 1D array may not be required.

Figure 29:
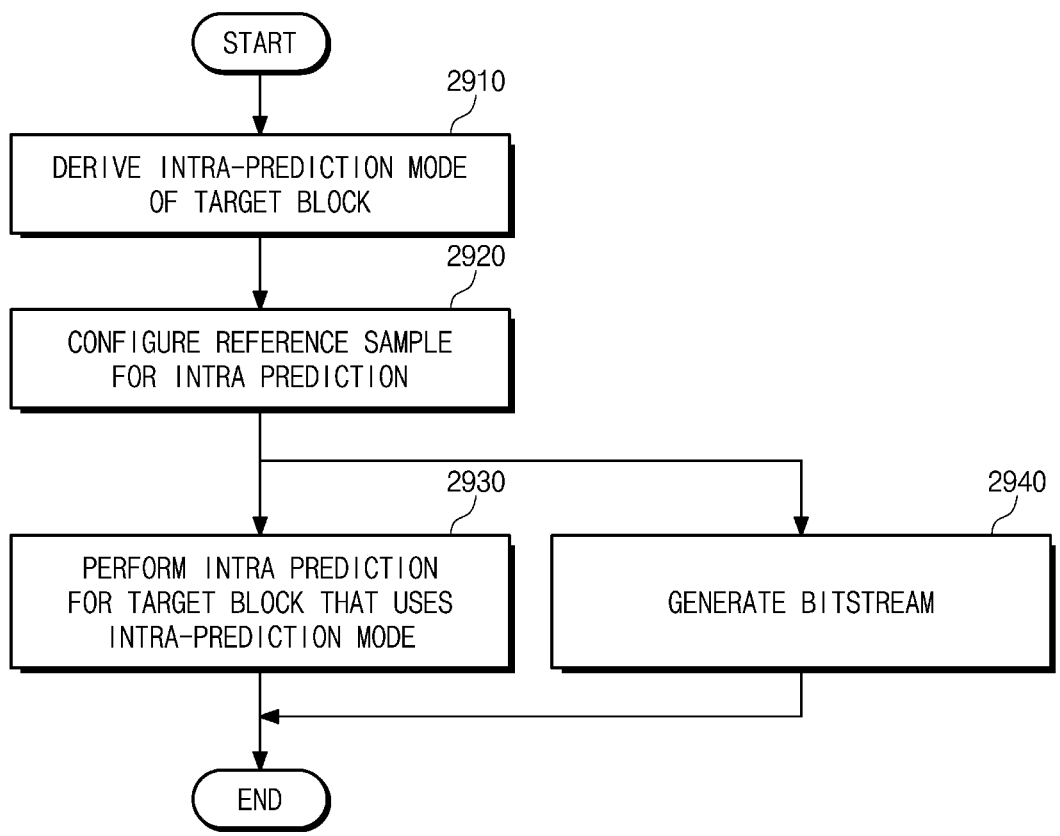
FIG. 29 is a flowchart illustrating a target block prediction method and a bitstream generation method according to an embodiment.

FIG. 29 is a flowchart illustrating a target block prediction method and a bitstream generation method according to an embodiment.

The target block prediction method and the bitstream generation method according to the present embodiment may be performed by an encoding apparatus 1600. The present embodiment may be a part of a target block encoding method or a video encoding method.

At step 2910, a processing unit 1610 may derive an intra-prediction mode of a target block.

Step 2910 may correspond to step 1810, described above with reference to FIG. 18.

The processing unit 1610 may derive the intra-prediction mode of the target block in consideration of rate-distortion costs of intra-prediction modes from intra-prediction modes available for the target block.

At step 2920, the processing unit 1610 may configure a reference sample for intra prediction.

Step 2920 may correspond to step 1820, described above with reference to FIG. 18.

At step 2930, the processing unit 1610 may perform intra prediction for the target block that uses the derived intra-prediction mode. The processing unit may generate a prediction block for the target block via intra prediction.

Step 2930 may correspond to step 1830, described above with reference to FIG. 18.

Information about an encoded target block may be generated by performing intra prediction for the target block that uses the derived intra-prediction mode.

The prediction block may be generated via intra prediction for the target block that uses the derived intra-prediction mode, and a residual block, which is a difference between the target block and the prediction block, may be generated. Information about the encoded target block may be generated by applying a transform and quantization to the residual block.

The information about the encoded target block may include transformed and quantized coefficients for the target block. The information about the encoded target block may include coding parameters for the target block.

At step 2940, the processing unit 1610 may generate a bitstream.

The bitstream may include information about the encoded target block.

The bitstream may include prediction information. The prediction information may be the above-described information about intra prediction for the target block. The information about intra prediction for the target block may include coding parameters related to the target block and/or sub-blocks for intra prediction, which have been described in the above embodiments.

The prediction information may be generated at step 2940, or may be generated at least partially at steps 2910, 2920, and 2930.

The processing unit 1610 may store the generated bitstream in storage 1640. Alternatively, a communication unit 1620 may transmit the bitstream to a decoding apparatus 1700.

The processing unit 1610 may perform entropy encoding on the prediction information, and may generate a bitstream including entropy-encoded prediction information.

The embodiment may be combined with the operation of the encoding apparatus 100, described above with reference to FIG. 1. For example, steps 2910, 2920, and 2930 may be performed by the intra-prediction unit 120 of FIG. 1. Operations at step S2940 may be performed by the entropy-encoding unit 150 of FIG. 1. Also, before, after and while steps 2910, 2920, 2930, and 2940 are performed, operations conducted by other components of the encoding apparatus 100 may be performed.

Figure 30:
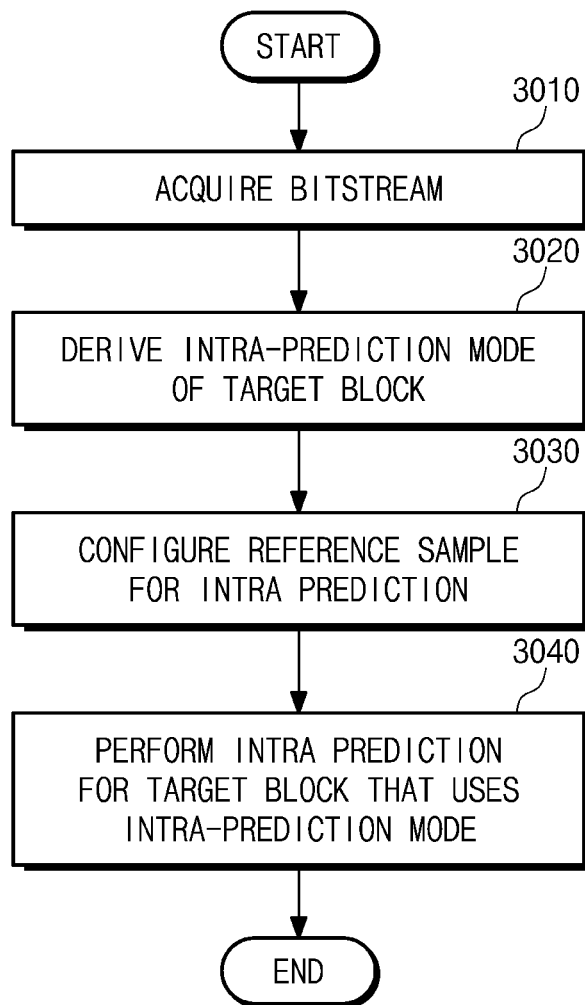
FIG. 30 is a flowchart illustrating a target block prediction method using a bitstream according to an embodiment.

FIG. 30 is a flowchart illustrating a target block prediction method using a bitstream according to an embodiment.

The target block prediction method using a bitstream according to the present embodiment may be performed by a decoding apparatus 1700. The present embodiment may be a part of a target block decoding method or a video decoding method.

At step 3010, a communication unit 1720 may acquire a bitstream. The communication unit 1720 may receive the bitstream from the encoding apparatus 1600.

The bitstream may include information about an encoded target block.

The information about the encoded target block may include transformed and quantized coefficients for the target block. The information about the encoded target block may include coding parameters for the target block.

The bitstream may include prediction information. The prediction information may be the above-described information about intra prediction for the target block. The information about intra prediction for the target block may include coding parameters related to the target block and/or sub-blocks for intra prediction, which have been described in the above embodiments.

The processing unit 1710 may store the acquired bitstream in storage 1740.

The processing unit 1710 may acquire prediction information from the bitstream. The processing unit 1710 may acquire prediction information by performing entropy decoding on the entropy-encoded prediction information of the bitstream.

At step 3020, the processing unit 1710 may derive an intra-prediction mode of the target block.

Step 3020 may correspond to step 1810, described above with reference to FIG. 18.

The processing unit 1710 may determine an intra-prediction mode of the target block based on the prediction information.

At step 3030, the processing unit 1710 may configure a reference sample for intra prediction.

Step 3030 may correspond to step 1820, described above with reference to FIG. 18.

At step 3040, the processing unit 1710 may perform intra prediction for the target block that uses the derived intra-prediction mode. The processing unit may generate a prediction block for the target block via intra prediction.

Step 3040 may correspond to step 1830, described above with reference to FIG. 18. Further, at step 3040, the prediction block may be generated by performing intra prediction for the target block that uses the derived intra-prediction mode, and a reconstructed block, which is the sum of the prediction block and a reconstructed residual block, may be generated.

The embodiment may be combined with the operation of the decoding apparatus 200, described above with reference to FIG. 2. For example, operations at step 3010 may be performed by the entropy-decoding unit 210 of FIG. 2. Operations at steps 3020, 3030, and 3040 may be performed by the intra-prediction unit 240 of FIG. 2. Also, before, after and while steps 3010, 3020, 3030, and 3040 are performed, operations conducted by other components of the decoding apparatus 200 may be performed.

There are provided an encoding apparatus and method and a decoding apparatus and method, which perform intra-prediction for a target block using an MPM list.

There are provided an encoding apparatus and method and a decoding apparatus and method, which configure an MPM list using a temporal neighbor block of a target block.

There are provided an encoding apparatus and method and a decoding apparatus and method, which configure an MPM list using the directionality of a neighbor block of a target block.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. A decoding method, comprising:
deriving a prediction mode of a target block; and
generating a prediction block for the target block by performing prediction for the target block that uses the prediction mode, wherein:
the prediction is performed based on a first difference and a second difference,
the first difference is determined based on a value of a first pixel and a value of a second pixel,
the second difference is determined based on a value of a third pixel and a value of a fourth pixel,
the first pixel is adjacent to an upper side of a fifth pixel,
the second pixel is adjacent to a lower side of the fifth pixel,
the third pixel is adjacent to a left side of the fifth pixel, and
the fourth pixel is adjacent to a right side of the fifth pixel.

2. The decoding method of claim 1, wherein the prediction mode of the target block is derived based on a first prediction mode of a first neighboring block and a second prediction mode of a second neighboring block,
the first neighboring block is a rightmost block among blocks adjacent to an upper side of the target block, and
the second neighboring block is a lowest block among blocks adjacent to a left side of the target block.

3. The decoding method of claim 1, wherein the prediction for the target block is performed based on a horizontal reference pixel line and a vertical reference pixel line,
the horizontal reference pixel line is not adjacent to the target block, and
the vertical reference pixel line is not adjacent to the target block.

4. The decoding method of claim 1, further comprising:
generating a reconstructed block based on the prediction block and a reconstructed residual block,
wherein the reconstructed residual block is generated using a second transform and a first transform, and
wherein the first transform comprises a transform for a horizontal direction and a transform for a vertical direction.

5. The decoding method of claim 1, wherein the prediction is performed using a reference sample line selected from a plurality of reference sample lines, and
filtering for reference samples in the selected reference sample line is performed in a case that the selected reference sample line is adjacent to the target block.

6. An encoding method, comprising:
deriving a prediction mode of a target block;
generating a prediction block for the target block by performing prediction for the target block that uses the prediction mode, and
generating prediction information, wherein:
the prediction information indicates that prediction for the target block is performed based on a first difference and a second difference for decoding for the target block,
the first difference is determined based on a value of a first pixel and a value of a second pixel,
the second difference is determined based on a value of a third pixel and a value of a fourth pixel,
the first pixel is adjacent to an upper side of a fifth pixel,
the second pixel is adjacent to a lower side of the fifth pixel,
the third pixel is adjacent to a left side of the fifth pixel, and
the fourth pixel is adjacent to a right side of the fifth pixel.

7. The encoding method of claim 6, further wherein:
the prediction information indicates that a prediction mode of the target block is derived based on a first prediction mode of a first neighboring block and a second prediction mode of a second neighboring block for decoding for the target block,
the first neighboring block is a rightmost block among blocks adjacent to an upper side of the target block, and
the second neighboring block is a lowest block among blocks adjacent to a left side of the target block.

8. The encoding method of claim 6, wherein:
the prediction information indicates that prediction for the target block is performed based on a horizontal reference pixel line and a vertical reference pixel line for decoding for the target block,
the horizontal reference pixel line is not adjacent to the target block, and
the vertical reference pixel line is not adjacent to the target block.

9. The encoding method of claim 6, further comprising:
generating a reconstructed block based on the prediction block and a reconstructed residual block, wherein:
the reconstructed residual block is generated using a second transform and a first transform, and
the first transform comprises a transform for a horizontal direction and a transform for a vertical direction.

10. The encoding method of claim 6, wherein the prediction is performed using a reference sample line selected from a plurality of reference sample lines, and
filtering for reference samples in the selected reference sample line is performed in a case that the selected reference sample line is adjacent to the target block.

11. A non-transitory computer-readable storage medium storing a bitstream, the bitstream comprising:
encoded information for a target block;
wherein decoding for the target block is performed using the encoded information,
a prediction mode of the target block is derived;
a prediction block for the target block is generated by performing prediction for the target block that uses the prediction mode,
the prediction is performed based on a first difference and a second difference,
the first difference is determined based on a value of a first pixel and a value of a second pixel, the second difference is determined based on a value of a third pixel and a value of a fourth pixel, the first pixel is adjacent to an upper side of a fifth pixel, the second pixel is adjacent to a lower side of the fifth pixel, the third pixel is adjacent to a left side of the fifth pixel, and the fourth pixel is adjacent to a right side of the fifth pixel.

\* \* \* \* \*